(12) United States Patent
Ma et al.

(10) Patent No.: US 12,275,448 B2
(45) Date of Patent: Apr. 15, 2025

(54) CHILD STROLLER

(71) Applicant: GOODBABY CHILD PRODUCTS CO., LTD., Jiangsu (CN)

(72) Inventors: Fusheng Ma, Jiangsu (CN); Pingzhong Shi, Jiangsu (CN)

(73) Assignee: GOODBABY CHILD PRODUCTS CO., LTD., Jiangsu (CN)

(*) Notice: Subject to any disclaimer, the term of this patent is extended or adjusted under 35 U.S.C. 154(b) by 307 days.

(21) Appl. No.: 17/813,913

(22) Filed: Jul. 20, 2022

(65) Prior Publication Data

US 2022/0348248 A1 Nov. 3, 2022

Related U.S. Application Data

(63) Continuation of application No. PCT/CN2020/083674, filed on Apr. 8, 2020.

(30) Foreign Application Priority Data

Jan. 22, 2020 (CN) .......................... 202010073238.2
Apr. 7, 2020 (CN) .......................... 202010263191.6

(51) Int. Cl.
*B62B 7/08* (2006.01)
*B62B 7/06* (2006.01)

(52) U.S. Cl.
CPC ................ *B62B 7/08* (2013.01); *B62B 7/064* (2013.01)

(58) Field of Classification Search
CPC .................................. B62B 7/08; B62B 7/064
See application file for complete search history.

(56) References Cited

U.S. PATENT DOCUMENTS 9,517,788 B2 * 12/2016 He ........................... B62B 7/08
9,834,243 B1    12/2017 Lian et al.
(Continued)

FOREIGN PATENT DOCUMENTS

CN    201272388 Y    7/2009
CN    202518294 U    11/2012
(Continued)

OTHER PUBLICATIONS

International Search Report and Written Opinion issued for International Patent Application No. PCT/CN2020/083674, dated Oct. 23, 2020 in 10 pages.
(Continued)

*Primary Examiner* — Jacob B Meyer
(74) *Attorney, Agent, or Firm* — Knobbe, Martens, Olson & Bear, LLP

(57) ABSTRACT

A child stroller includes a stroller frame having an unfolded state and a first folded state, and includes a left support frame on a left side, a right support frame on a right side. Each of the left support frame and the right support frame includes a first bottom frame and a second bottom frame being a telescopic rod assembly, and includes an upper rod with a lower end portion connected to one of the second wheel assemblies and a lower rod disposed below the upper rod and slidably connected to the upper rod in an up-down direction. When the stroller frame in the unfolded state, one of the first bottom frame and the second bottom frame is inclined upward from front to rear, and the other one is inclined upward from rear to front.

14 Claims, 18 Drawing Sheets

(56) References Cited

U.S. PATENT DOCUMENTS

| | | | |
|---|---|---|---|
| 9,950,730 B2* | 4/2018 | Gao | B62B 7/062 |
| 11,904,925 B2* | 2/2024 | Ma | B62B 7/08 |
| 11,919,559 B2* | 3/2024 | Gao | B62B 7/062 |
| 2003/0116943 A1 | 6/2003 | Combi et al. | |
| 2017/0190349 A1* | 7/2017 | Tan | B62B 7/064 |
| 2018/0065654 A1 | 3/2018 | Wonderland et al. | |
| 2022/0348248 A1* | 11/2022 | Ma | B62B 7/064 |

FOREIGN PATENT DOCUMENTS

| | | | | |
|---|---|---|---|---|
| CN | 103507846 B | | 1/2014 | |
| CN | 203681623 U | | 7/2014 | |
| CN | 204472864 U | | 7/2015 | |
| CN | 204527263 U | | 8/2015 | |
| CN | 105539557 A | | 5/2016 | |
| CN | 107264600 A | | 10/2017 | |
| CN | 107697142 A | | 2/2018 | |
| CN | 107985380 A | | 5/2018 | |
| CN | 108313113 A | | 7/2018 | |
| CN | 106080734 A | | 11/2018 | |
| CN | 108773408 A | | 11/2018 | |
| CN | 109720394 A | | 5/2019 | |
| CN | 110271594 A | | 9/2019 | |
| CN | 110758528 A | * | 2/2020 | |
| CN | 111152826 A | * | 5/2020 | |
| CN | 111152827 A | * | 5/2020 | |
| CN | 111391908 A | * | 7/2020 | B62B 7/06 |
| CN | 111891205 A | * | 11/2020 | |
| CN | 211995808 U | * | 11/2020 | |
| CN | 211995809 U | * | 11/2020 | |
| CN | 211995810 U | * | 11/2020 | |
| CN | 112009550 A | * | 12/2020 | |
| CN | 112009552 A | * | 12/2020 | |
| CN | 212637611 U | * | 3/2021 | |
| CN | 113753115 A | * | 12/2021 | |
| CN | 113799865 A | * | 12/2021 | |
| CN | 114104070 A | * | 3/2022 | |
| CN | 114104071 A | * | 3/2022 | |
| CN | 216861568 U | | 7/2022 | |
| CN | 115303353 A | * | 11/2022 | |
| CN | 113753115 B | * | 1/2023 | |
| DE | 202005001882 U1 | | 5/2005 | |
| EP | 0719693 A2 | | 7/1996 | |
| EP | 2001723 A1 | | 12/2008 | |
| EP | 2248707 B1 | | 11/2010 | |
| EP | 2949543 A1 | | 12/2015 | |
| EP | 4095014 A1 | * | 11/2022 | B62B 7/06 |
| GB | 2290269 A | | 12/1995 | |
| JP | 2007153295 A | | 6/2007 | |
| JP | 2016506338 A | | 3/2016 | |
| JP | 2016094048 A | | 5/2016 | |
| JP | 6817470 B2 | * | 1/2021 | B62B 7/083 |
| JP | 2023512977 A | * | 3/2023 | |
| KR | 200485911 Y1 | | 3/2018 | |
| KR | 20220124240 A | * | 9/2022 | |
| WO | WO-2021147178 A1 | * | 7/2021 | B62B 7/06 |

OTHER PUBLICATIONS

First Office Action issued for Chinese Patent Application No. 202010263191.6, dated Nov. 4, 2020 in 17 pages.

Second Office Action issued for Chinese Patent Application No. 202010263191.6, dated Apr. 26, 2021 in 15 pages.

* cited by examiner

CHILD STROLLER

CROSS-REFERENCE TO RELATED APPLICATIONS

This application is a continuation of International Application No. PCT/CN2020/083674, filed Apr. 8, 2020, which is hereby incorporated by reference in its entirety and which claims priority to Chinese Patent Application No. 202010073238.2, filed Jan. 22, 2020 and Chinese Patent Application No. 202010263191.6, filed Apr. 7, 2020.

TECHNICAL FIELD

The present disclosure relates to the field of children products, and specifically to a child stroller.

BACKGROUND

In order to make it convenient to carry and store the children stroller in the prior art, the stroller is foldable. There are many types of existing children's strollers, the stroller frame have different numbers of rods, and the connection between the rods are different, so the folding principle and folding method thereof are different, and the folding results are also different. At the same time, the length of the front support or the rear support of the existing stroller after folded is too long, which will result in a larger overall volume of the stroller.

SUMMARY

The present disclosure is aimed to overcome the deficiencies of the conventional art, and provide an improved child stroller with telescopic front or rear support frames to make the folded stroller smaller.

An aspect provides a child stroller comprising a stroller frame having an unfolded state and a first folded state, first wheel assemblies, second wheel assemblies, a lock mechanism for locking the stroller frame in the unfolded state, and a seat rod disposed on the frame, wherein the stroller frame comprises a left support frame on a left side, a right support frame on a right side, and a connection frame connected between the left support frame and the right support frame, and each of the left support frame and the right support frame comprises: a first bottom frame, wherein in the unfolded state of the frame, the first bottom frame extends obliquely from front to rear and upward, the lower end portion of the first bottom frame is connected to the first wheel assemblies, and the first wheel assemblies is a front wheel assemblies; a second bottom frame, wherein in the unfolded state of the frame, the second bottom frame extends obliquely from rear to front and upward, the second bottom frame is a telescopic rod assembly, the second bottom frame comprises an upper rod and a lower rod disposed below the upper rod and slidably connected to the upper rod in the up-down direction, the upper rod is slidably inserted in the lower rod or the lower rod is slidably inserted in the upper rod, a lower end portion of the lower rod is connected to the second wheel assemblies, and the second wheel assemblies is a rear wheel assemblies; a side rod, wherein for an upper end portion of the first bottom frame, an upper end portion of the upper rod and a lower end portion of the side rod, two of the foregoing three portions are rotatably connected, and the third portion is rotatably connected to one of the two portions; a supporting rod rotatably connected to the upper rod via a first shaft; a push rod, a lower portion thereof being respectively connected to an upper end portion of the side rod and an upper end portion of the supporting rod; a connection rod extending in a front-rear direction when the frame is in the unfolded state, wherein an end portion of the connection rod is rotatably connected to a lower portion of the first bottom frame via a second shaft, the connection rod is further rotatably connected to the supporting rod via a third shaft, and in the unfolded state of the frame, the third shaft is below the first shaft; the child stroller further comprises a driving mechanism for driving the lower rod to slide downward relative to the upper rod when the frame is converted from the first folded state to the unfolded state, and the driving mechanism is an elastic member arranged between the upper rod and the lower rod, the elastic member is used to provide the elastic force required for the lower rod to slide downward relative to the upper rod;

the connection frame comprises: a first transverse rod, wherein an end portion of the first transverse rod is rotatably connected with the first bottom frame of the left support frame via a I-I shaft, and the other end portion of the first transverse rod is rotatably connected with the first bottom frame of the right support frame via a II-I shaft; a second transverse rod, wherein an end portion of the second transverse rod is rotatably connected with the upper rod of the left support frame via a I-II shaft, and the other end portion of the second transverse rod is rotatably connected with the upper rod of the right support frame via a II-II shaft; an upper transverse rod, wherein an end portion of the upper transverse rod is rotatably connected with the push rod of the left support frame via a I-III shaft, and the other end portion of the upper transverse rod is rotatably connected with the push rod of the right support frame via a II-III shaft; a connection-rod transverse rod, wherein an end portion of the connection-rod transverse rod is rotatably connected with the supporting rod of the left support frame via a I-IV shaft, and the other end portion of the connection-rod transverse rod is rotatably connected with the supporting rod of the right support frame via a II-IV shaft; the frame further has a second folded state, when the frame is converted from the first folded state to the second folded state, the left support frame is folded and turned around the I-I shaft, the I-II shaft, and the I-III shaft respectively relative to the connection frame, the right support frame is folded and turned around the II-I shaft, the II-II shaft, and the II-III shaft respectively relative to the connection frame; when the frame is in the second folded state, the axis of the I-I shaft, the axis of the I-II shaft, the axis of the I-III shaft and the axis of the I-IV shaft are parallel or coincident, and the axis of the II-I shaft, the axis of the II-II shaft, the axis of the II-III shaft and the axis of the II-IV shaft are parallel or coincident.

Another aspect provides a child stroller comprising a stroller frame having an unfolded state and a first folded state, first wheel assemblies, second wheel assemblies, a lock mechanism for locking the stroller frame in the unfolded state, and a seat rod disposed on the frame, wherein the stroller frame comprises a left support frame on a left side, a right support frame on a right side, and a connection frame connected between the left support frame and the right support frame, and each of the left support frame and the right support frame comprises: a first bottom frame, wherein in the unfolded state of the frame, the first bottom frame extends obliquely from front to rear and upward, the lower end portion of the first bottom frame is connected to the first wheel assemblies, and the first wheel assemblies is a front wheel assemblies; a second bottom frame, wherein in the unfolded state of the frame, the second bottom frame extends obliquely from rear to front and upward, the second bottom frame is a telescopic rod assembly, the second bottom frame comprises an upper rod and a lower rod disposed below the upper rod and slidably connected to the upper rod in the up-down direction, a lower end portion of the lower rod is connected to the second wheel assemblies, and the second wheel assemblies is a rear wheel assemblies; a side rod, wherein for an upper end portion of the first bottom frame, an upper end portion of the upper rod and a lower end portion of the side rod, two of the foregoing three portions are rotatably connected, and the third portion is rotatably connected to one of the two portions; a supporting rod rotatably connected to the upper rod via a first shaft; a push rod, a lower portion thereof being respectively connected to an upper end portion of the side rod and an upper end portion of the supporting rod; a connection rod extending in a front-rear direction when the frame is in the unfolded state, wherein an end portion of the connection rod is rotatably connected to a lower portion of the first bottom frame via a second shaft, the connection rod is further rotatably connected to the supporting rod via a third shaft, and in the unfolded state of the frame, the third shaft is below the first shaft; the child stroller further comprises a driving mechanism for driving the lower rod to slide upward relative to the upper rod when the frame is converted from the unfolded state to the first folded state and driving the lower rod to slide downward relative to the upper rod when the frame is converted from the first folded state to the unfolded state, the driving mechanism is a driving rod, which extends in the front-rear direction in the unfolded state of the frame, and one end portion of the driving rod is rotatably connected with the lower rod via a sixth shaft, the other end portion of the driving rod is rotatably connected with the connection rod via a fourth shaft, the third shaft is located between the second shaft and the fourth shaft, the upper rod is provided with a guide groove extending in the extension direction of the upper rod, and the sixth shaft is slidably arranged in the guide groove;

the connection frame comprises: a first transverse rod, wherein an end portion of the first transverse rod is rotatably connected with the first bottom frame of the left support frame via a I-I shaft, and the other end portion of the first transverse rod is rotatably connected with the first bottom frame of the right support frame via a II-I shaft; a second transverse rod, wherein an end portion of the second transverse rod is rotatably connected with the upper rod of the left support frame via a I-II shaft, and the other end portion of the second transverse rod is rotatably connected with the upper rod of the right support frame via a II-II shaft; an upper transverse rod, wherein an end portion of the upper transverse rod is rotatably connected with the push rod of the left support frame via a I-III shaft, and the other end portion of the upper transverse rod is rotatably connected with the push rod of the right support frame via a II-III shaft; a connection-rod transverse rod, wherein an end portion of the connection-rod transverse rod is rotatably connected with the supporting rod of the left support frame via a I-IV shaft, and the other end portion of the connection-rod transverse rod is rotatably connected with the supporting rod of the right support frame via a II-IV shaft; the frame further has a second folded state, when the frame is converted from the first folded state to the second folded state, the left support frame is folded and turned around the I-I shaft, the I-II shaft, and the I-III shaft respectively relative to the connection frame, the right support frame is folded and turned around the II-I shaft, the II-II shaft, and the II-III shaft respectively relative to the connection frame; when the frame is in the second folded state, the axis of the I-I shaft, the axis of the I-II shaft, the axis of the I-III shaft and the axis of the I-IV shaft are parallel or coincident, and the axis of the II-I shaft, the axis of the II-II shaft, the axis of the II-III shaft and the axis of the II-IV shaft are parallel or coincident.

Another aspect provides a child stroller comprising a stroller frame having an unfolded state and a first folded state, first wheel assemblies, second wheel assemblies, a lock mechanism for locking the stroller frame in the unfolded state, and a seat rod disposed on the frame, wherein the stroller frame comprises a left support frame on a left side, a right support frame on a right side, and a connection frame connected between the left support frame and the right support frame, and each of the left support frame and the right support frame comprises: a first bottom frame, wherein in the unfolded state of the frame, the first bottom frame extends obliquely from front to rear and upward, the lower end portion of the first bottom frame is connected to the first wheel assemblies, and the first wheel assemblies is a front wheel assemblies; a second bottom frame, wherein in the unfolded state of the frame, the second bottom frame extends obliquely from rear to front and upward, the second bottom frame is a telescopic rod assembly, the second bottom frame comprises an upper rod and a lower rod disposed below the upper rod and slidably connected to the upper rod in the up-down direction, a lower end portion of the lower rod is connected to the second wheel assemblies, and the second wheel assemblies is a rear wheel assemblies; a side rod, wherein for an upper end portion of the first bottom frame, an upper end portion of the upper rod and a lower end portion of the side rod, two of the foregoing three portions are rotatably connected, and the third portion is rotatably connected to one of the two portions; a supporting rod rotatably connected to the upper rod via a first shaft; a push rod, a lower portion thereof being respectively connected to an upper end portion of the side rod and an upper end portion of the supporting rod; a connection rod extending in a front-rear direction when the frame is in the unfolded state, wherein an end portion of the connection rod is rotatably connected to a lower portion of the first bottom frame via a second shaft, the connection rod is further rotatably connected to the supporting rod via a third shaft, and in the unfolded state of the frame, the third shaft is below the first shaft; the child stroller further comprises a driving mechanism for driving the lower rod to slide upward relative to the upper rod when the frame is converted from the unfolded state to the first folded state and driving the lower rod to slide downward relative to the upper rod when the frame is converted from the first folded state to the unfolded state, the driving mechanism is a driving rod, one end portion of the driving rod is rotatably connected with the lower rod via a sixth shaft, the other end portion of the driving rod is rotatably connected with the supporting rod via a fifth shaft, and in the unfolded state of the frame, the fifth shaft is located below the first shaft, the upper rod is provided with a guide groove extending in the extension direction of the upper rod, and the sixth shaft is slidably arranged in the guide groove;

the connection frame comprises: a first transverse rod, wherein an end portion of the first transverse rod is rotatably connected with the first bottom frame of the left support frame via a I-I shaft, and the other end portion of the first transverse rod is rotatably connected with the first bottom frame of the right support frame via a II-I shaft; a second transverse rod, wherein an end portion of the second transverse rod is rotatably connected with the upper rod of the left support frame via a I-II shaft, and the other end portion of the second transverse rod is rotatably connected with the upper rod of the right support frame via a II-II shaft; an upper transverse rod, wherein an end portion of the upper transverse rod is rotatably connected with the push rod of the left support frame via a I-III shaft, and the other end portion of the upper transverse rod is rotatably connected with the push rod of the right support frame via a II-III shaft; a connection-rod transverse rod, wherein an end portion of the connection-rod transverse rod is rotatably connected with the supporting rod of the left support frame via a I-IV shaft, and the other end portion of the connection-rod transverse rod is rotatably connected with the supporting rod of the right support frame via a II-IV shaft; the frame further has a second folded state, when the frame is converted from the first folded state to the second folded state, the left support frame is folded and turned around the I-I shaft, the I-II shaft, and the I-III shaft respectively relative to the connection frame, the right support frame is folded and turned around the II-I shaft, the II-II shaft, and the II-III shaft respectively relative to the connection frame; when the frame is in the second folded state, the axis of the I-I shaft, the axis of the I-II shaft, the axis of the I-III shaft and the axis of the I-IV shaft are parallel or coincident, and the axis of the II-I shaft, the axis of the II-II shaft, the axis of the II-III shaft and the axis of the II-IV shaft are parallel or coincident.

Another aspect provides a child stroller comprising a stroller frame having an unfolded state and a first folded state, first wheel assemblies, second wheel assemblies, a lock mechanism for locking the stroller frame in the unfolded state, and a seat rod disposed on the stroller frame, wherein the frame comprises a left support frame on a left side, a right support frame on a right side, and a connection frame connected between the left support frame and the right support frame, and each of the left support frame and the right support frame comprises: a first bottom frame, with a lower end portion being connected to one of the first wheel assemblies; a second bottom frame, being a telescopic rod assembly, and comprising an upper rod with a lower end portion connected to one of the second wheel assemblies and a lower rod disposed below the upper rod and slidably connected to the upper rod in an up-down direction; a side rod, with a lower end portion, and two of an upper end portion of the first bottom frame, an upper end portion of the upper rod and the lower end portion of the side rod, are rotatably connected, and the third thereof is rotatably connected to one of the two; a supporting rod rotatably connected to the upper rod via a first shaft; a push rod, with a lower portion being respectively connected to an upper end portion of the side rod and an upper end portion of the supporting rod; a connection rod extending in a front-rear direction when the stroller frame is in the unfolded state, and with an end portion being rotatably connected to a lower portion of the first bottom frame via a second shaft, and the connection rod being further rotatably connected to the supporting rod via a third shaft; wherein, when the stroller is in the unfolded state, one of the first bottom frame and the second bottom frame is inclined upward from front to rear, and the other one is inclined upward from rear to front, and when the first bottom frame is inclined upward from front to rear and the second bottom frame is inclined upward from rear to front, the first wheel assemblies are front wheels, the second wheel assemblies are rear wheels, and a user stands on one side close to the second bottom frame and pushes the child stroller from rear to front, and of course, it can also be arranged that the second bottom frame is inclined upward from front to rear, and the first bottom frame is inclined upward from rear to front, and the first wheel assemblies are rear wheels, and a user stands on one side close to the first bottom frame and pushes the child stroller from rear to front.

In some embodiments, when the stroller frame is in the unfolded state, the third shaft is below the first shaft.

In some embodiments, when the stroller frame is in the unfolded state, the third shaft is above the first shaft.

In some embodiments, the first wheel assemblies are front wheel assemblies, and the second wheel assemblies are rear wheel assemblies.

In some embodiments, the child stroller further comprises a driving mechanism for driving the lower rod to slide upward relative to the upper rod when the stroller frame is converted from the unfolded state to the first folded state, and/or driving the lower rod to slide downward relative to the upper rod when the stroller frame is converted from the first folded state to the unfolded state.

In some embodiments, the upper rod is slidably inserted in the lower rod or the lower rod is slidably inserted in the upper rod, and the driving mechanism is an elastic member arranged between the upper rod and the lower rod, and the elastic member is used to provide an elastic force required for the lower rod to slide downward relative to the upper rod.

In some embodiments, the driving mechanism is a driving rod extending in the front-rear direction in the unfolded state of the stroller frame, one end portion of the driving rod is rotatably connected with the lower rod via a sixth shaft, an another end portion of the driving rod is rotatably connected with the connection rod via a fourth shaft, and the third shaft is located between the second shaft and the fourth shaft.

In some embodiments, the driving mechanism is a driving rod, one end portion of the driving rod is rotatably connected with the lower rod, an another end portion of the driving rod is rotatably connected with the supporting rod via a fifth shaft, and the fifth shaft is located below the first shaft when the stroller frame is in the unfolded state.

In some embodiments, the driving rod is rotatably connected with the lower rod via a sixth shaft, the upper rod is provided with a guide groove extending in an extension direction of the upper rod, and the sixth shaft is slidably arranged in the guide groove.

In some embodiments, the connection frame comprises: a first transverse rod, with an end portion being rotatably connected with the first bottom frame of the left support frame via a I-I shaft, and an another end portion being rotatably connected with the first bottom frame of the right support frame via a II-I shaft; a second transverse rod, with an end portion being rotatably connected with the second bottom frame of the left support frame via a I-II shaft, and an another end portion being rotatably connected with the second bottom frame of the right support frame via a II-II shaft; an upper transverse rod, with an end portion being rotatably connected with the push rod of the left support frame via a I-III shaft, and an another end portion being rotatably connected with the push rod of the right support frame via a II-III shaft; wherein, the stroller frame further has a second folded state, when the frame is converted from the first folded state to the second folded state, the left support frame is folded and turned around the I-I shaft, the I-II shaft, and the I-III shaft respectively relative to the connection frame, and the right support frame is folded and turned around the II-I shaft, the II-II shaft, and the II-III shaft respectively relative to the connection frame.

In some embodiments, the end portion of the second transverse rod is rotatably connected with the upper rod of the left support frame via the I-II shaft, and the another end portion of the second transverse rod is rotatably connected with the upper rod of the right support frame via the II-II shaft.

In some embodiments, when the stroller frame is in the second folded state, axes of the I-I shaft, the I-II shaft, and the I-III shaft are parallel to each other, and axes of the II-I shaft, the II-II shaft, and the II-III shaft are parallel to each other; or, axes of the I-I shaft, the I-II shaft, and the I-III shaft are coincident with each other, and axes of the II-I shaft, the II-II shaft, and the II-III shaft are coincident with each other.

In some embodiments, the connection frame further comprises a connection-rod transverse rod, an end portion of the connection-rod transverse rod is rotatably connected with the supporting rod of the left support frame via a I-IV shaft, an another end portion of the connection-rod transverse rod is rotatably connected with the supporting rod of the right support frame via a II-IV shaft, and when the stroller frame is in the second folded state, axes of the I-I shaft, the I-II shaft, the I-III shaft and the I-IV shaft are parallel or coincident with each other, and axes of the II-I shaft, the II-II shaft, the II-III shaft and the II-IV shaft are parallel or coincident with each other.

Due to the use of the above technical solutions, the present disclosure has the following advantages over the prior art: it is convenient to fold and unfold the child stroller of the present disclosure, which is convenient for consumers to use, and the folded construction thereof is more compact by configuring the second bottom frame as a telescopic rod assembly.

Figure 1:
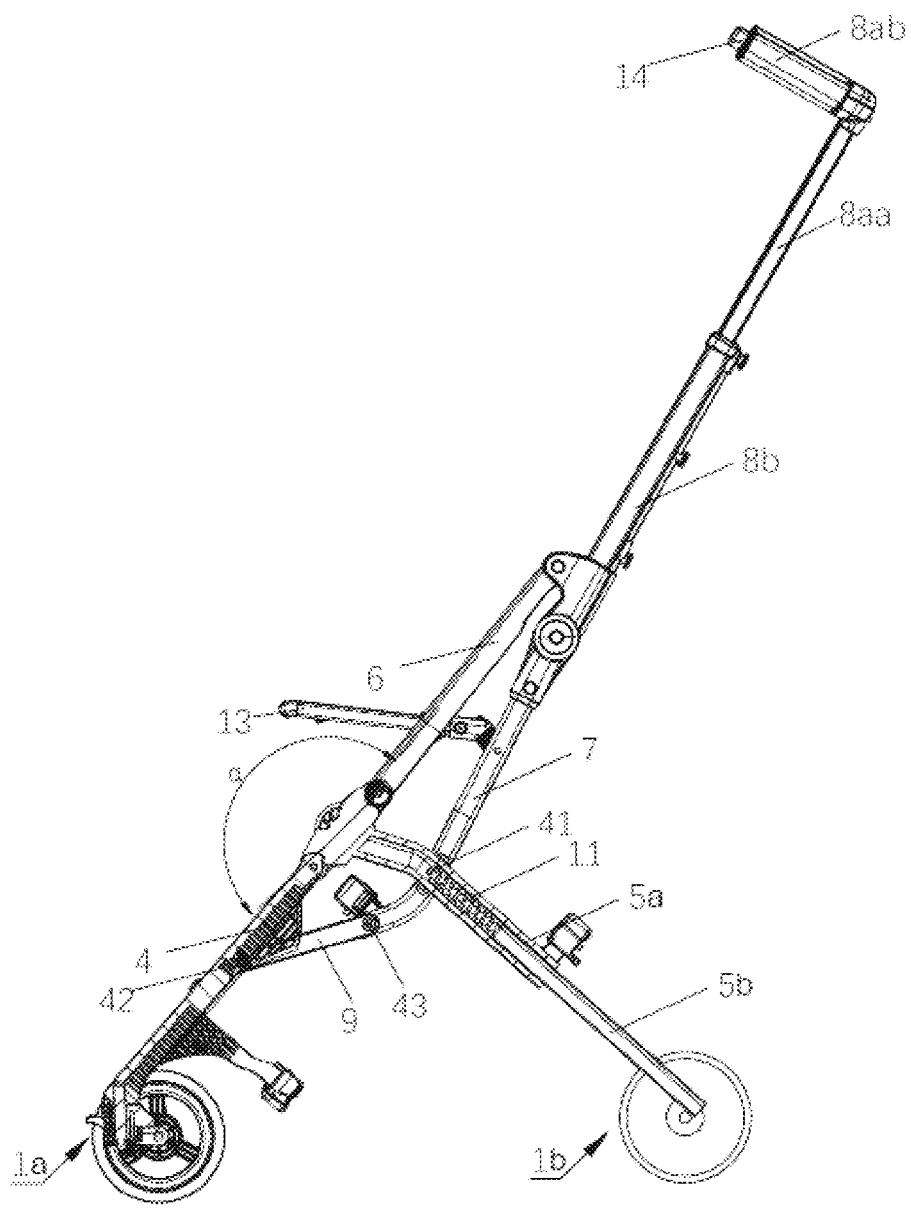
FIG. 1 is a side cross-sectional view of a stroller frame of a child stroller in an unfolded state of Embodiment 1 according to the present disclosure.
Figure 2:
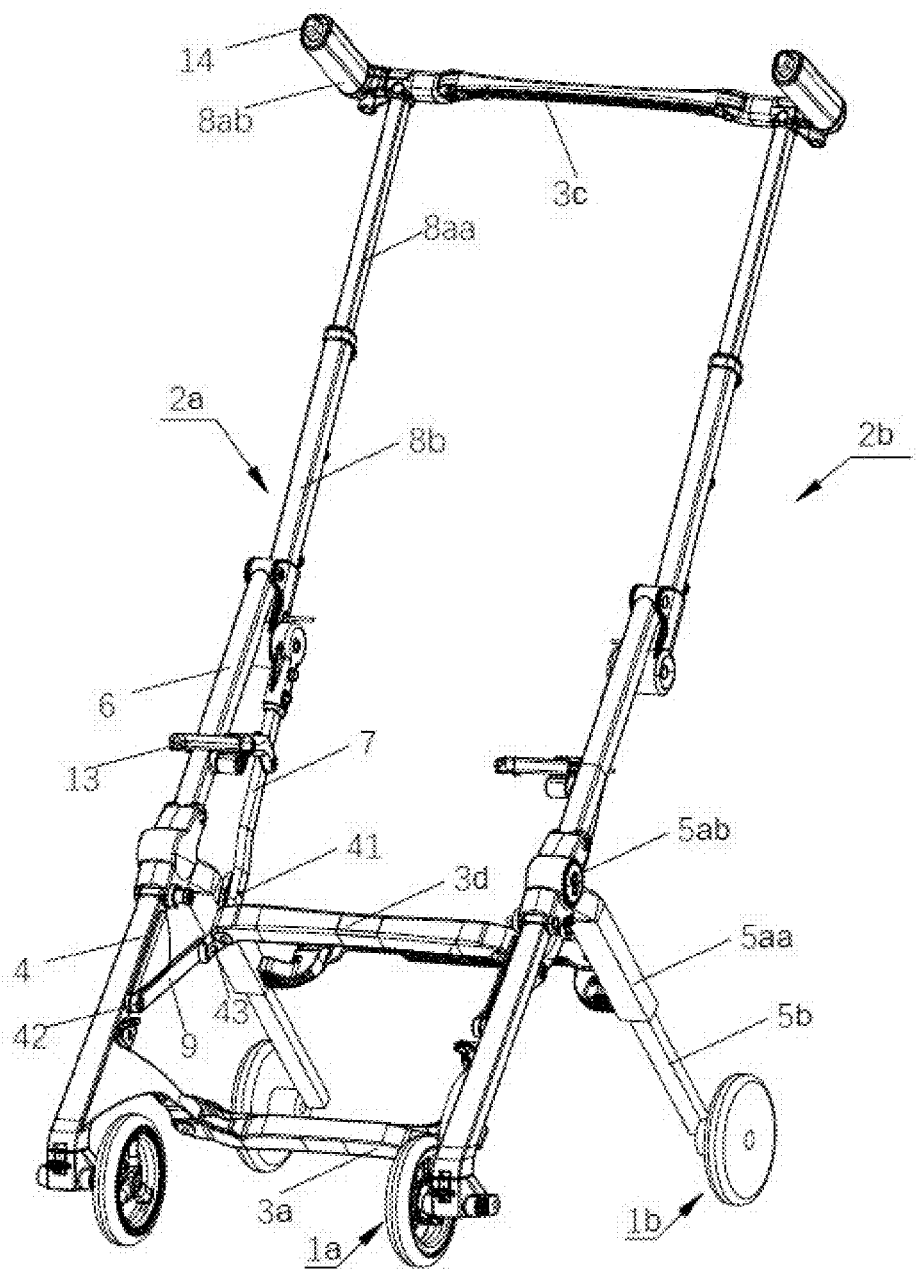
FIG. 2 is a stereogram of the stroller frame of the child stroller in the unfolded state of Embodiment 1 according to the present disclosure.
Figure 3:
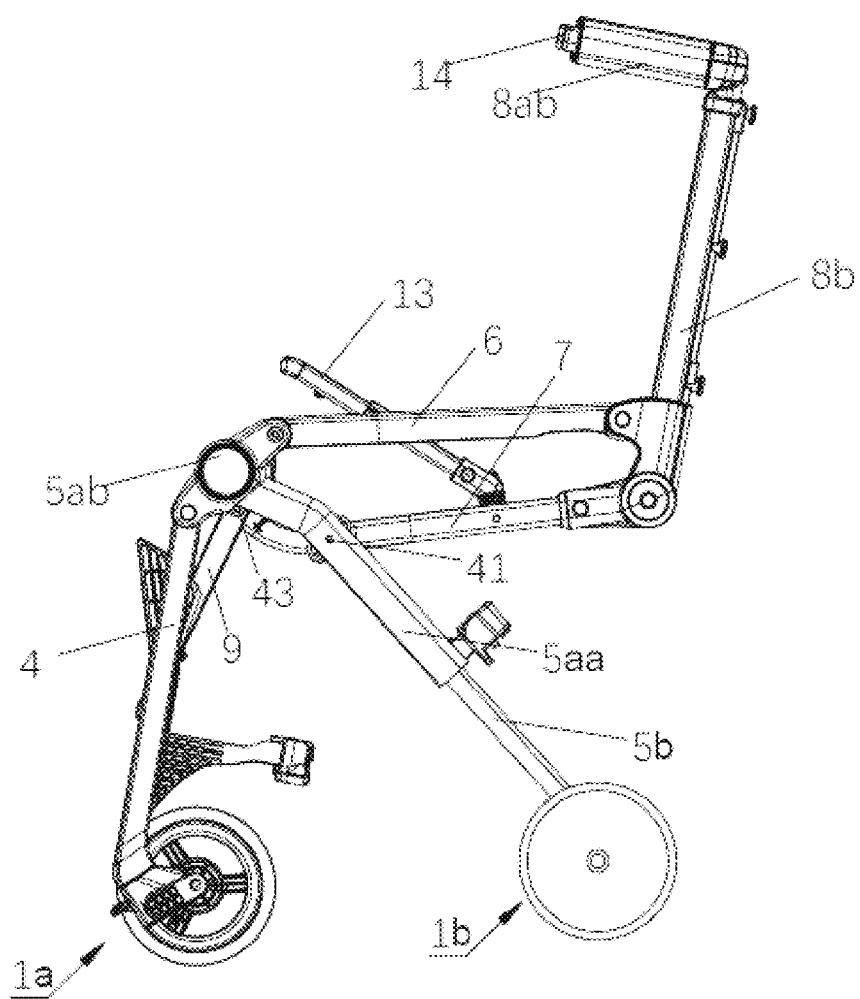
FIG. 3 is a side view of the stroller frame of the child stroller of Embodiment 1 according to the present disclosure during converting between the unfolded state and a first folded state.
Figure 4:
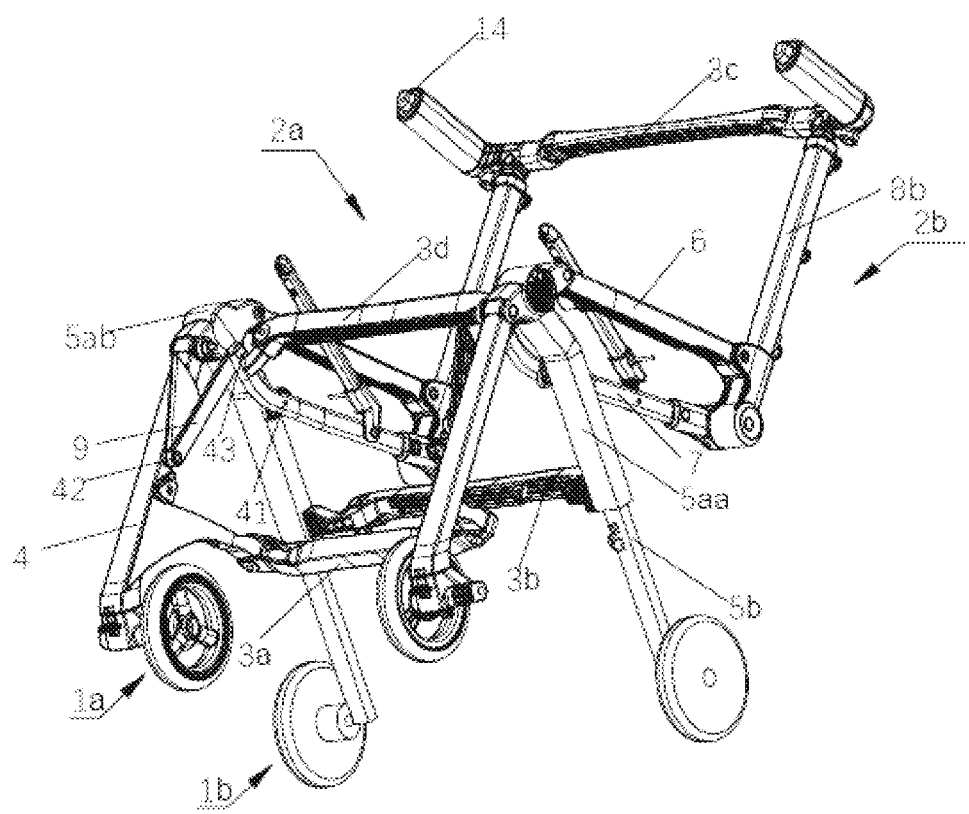
FIG. 4 is a stereogram of the stroller frame of the child stroller of Embodiment 1 according to the present disclosure during converting between the unfolded state and the first folded state.

The references in the Figures are:
1a—first wheel assembly; 1b—second wheel assembly; 2a—right support frame; 2b—left support frame; 3a—first transverse rod; 3b—second transverse rod; 3c—upper transverse rod; 3d—connection-rod transverse rod; 4. first bottom frame; 5a—upper rod; 5aa—upper bar body; 5ab—extension rod; 5b—lower rod; 6-side rod; 7—supporting rod; 8aa—upper push rod body; 8ab—grip rod; 8b—lower push rod; 9—connection rod; 10—driving rod; 11—elastic member; 12—guide groove; 13—seat rod; 14—unlock button; 41—first shaft; 42—second shaft ; 43—third shaft; 44—fourth shaft; 45—fifth shaft; 46—sixth shaft; 51—II-I shaft; 52—II-II shaft; 53—II-III shaft; 54—II-IV shaft; 61—I-I shaft; 62—I-II shaft; 63—I-III shaft; 64—I-IV shaft.

DETAILED DESCRIPTION

In the following, the technical solution of the present disclosure is further described combining with the accompanying drawings and specific embodiments.

Embodiment 1

As shown in FIGS. 1-8, the child stroller in this embodiment comprises a stroller frame having an unfolded state and a first folded state, first wheel assemblies 1a, second wheel assemblies 1b, a lock mechanism (not shown) for locking the stroller frame in the unfolded state, and a seat rod 13 disposed on the stroller frame, wherein the stroller frame comprises a left support frame 2b on a left side, a right support frame 2a on a right side, and a connection frame connected between the left support frame 2b and the right support frame 2a, and each of the left support frame 2b and the right support frame 2a comprises:

a first bottom frame 4, with a lower end portion being connected to one of the first wheel assemblies 1a;

a second bottom frame, being a telescopic rod assembly, and comprising an upper rod 5a and a lower rod 5b disposed below the upper rod 5a and slidably connected to the upper rod 5a in an up-down direction, wherein, the upper rod 5a is slidably inserted in the lower rod 5b or the lower rod 5b is slidably inserted in the upper rod 5a, and a lower end portion of the lower rod 5b is connected to one of the second wheel assemblies 1b; in this embodiment, the first bottom frame 4 is inclined upward from front to rear when the stroller frame is in the unfolded state, and the second bottom frame is inclined upward from rear to front when the stroller frame is in the unfolded state, and the second wheel assemblies 1b are rear wheel assemblies;

a side rod 6, wherein two of an upper end portion of the first bottom frame 4, an upper end portion of the upper rod 5a and a lower end portion of the side rod 6 are rotatably connected, and the third one is rotatably connected to one of the aforementioned two, specifically in this embodiment, it is preferably that the upper end portion of the first bottom frame 4 is rotatably connected to the upper end portion of the upper rod 5a, and the lower end portion of the side rod 6 is rotatably connected to the upper end portion of the upper rod 5a; the upper rod 5a is provided with an upper rod body 5aa and an extension rod 5ab fixedly connected to an upper end portion of the upper rod body, two end portions of the extension rod 5ab are rotatably connected to the upper end portion of the first bottom frame 4 and the lower end portion of the side rod 6, respectively, and in the first folded state of the stroller frame, the extension rod 5ab extends substantially in a horizontal direction;

a supporting rod 7, rotatably connected to the upper rod 5a via a first shaft 41;

a push rod, with a lower portion being respectively connected to an upper end portion of the side rod 6 and an upper end portion of the supporting rod 7, wherein in this embodiment, the push rod is a telescopic rod assembly, and specifically comprises an upper push rod 8a and a lower push rod 8b slidably connected to a lower portion of the upper push rod, and the upper push rod comprises an upper push rod body 8aa and a grip rod 8ab fixedly disposed on an upper end portion of the upper push rod body 8aa, an end portion of the grip rod 8ab is provided with an unlock button 14 for unlocking the relative sliding relationship of the upper push rod and the lower push rod 8b; and a connection rod 9, extending in a front-rear direction when the stroller frame is in the unfolded state, wherein a front end portion of the connection rod 9 is rotatably connected to a lower portion of the first bottom frame 4 via a second shaft 42, a rear end portion of the connection rod 9 is rotatably connected to a lower portion of the supporting rod 7 via a third shaft 43, and in the unfolded state of the stroller frame, the third shaft 43 is below the first shaft 41.

The child stroller further comprises a driving mechanism for driving the lower rod 5b to slide upward relative to the upper rod 5a when the stroller frame is converted from the unfolded state to the first folded state, and/or driving the lower rod 5b to slide downward relative to the upper rod 5a when the stroller frame is converted from the first folded state to the unfolded state. In this embodiment, the driving mechanism 11 is an elastic member 11 arranged between the upper rod 5a and the lower rod 5b, the elastic member 11 is used to provide an elastic force required for the lower rod 5b to slide downward relative to the upper rod 5a, and when the stroller frame is in the unfolded state, the length of the second bottom frame is longer than that of the second bottom frame when the stroller frame is in the first folded state, specifically, a locking means (not shown) is disposed between the upper rod 5a and the lower rod 5b for relatively locking the position between the upper rod 5a and the lower rod 5b, that is, the locking means relatively locks the second bottom frame in an extended state in the unfolded state of the stroller frame and in a shortened state in the first folded state of the stroller frame.

The connection frame comprises:

a first transverse rod 3a, with an end portion being rotatably connected with the first bottom frame 4 of the left support frame 2b via a I-I shaft 61, and an another end portion being rotatably connected with the first bottom frame 4 of the right support frame 2a via a II-I shaft 51;

a second transverse rod 3b, with an end portion being rotatably connected with the upper rod 5a of the second bottom frame of the left support frame 2b via a I-II shaft 62, and an another end portion being rotatably connected with the upper rod 5a of the second bottom frame of the right support frame 2a via a II-II shaft 52; and an upper transverse rod 3c, with an end portion being rotatably connected with the push rod of the left support frame 2b via a I-III shaft 63, and an another end portion being rotatably connected with the push rod of the right support frame 2a via a II-III shaft 53;

wherein, the stroller frame further has a second folded state, when the stroller frame is converted from the first folded state to the second folded state, the left support frame 2b is folded and turned around the I-I shaft 61, the I-II shaft 62, and the I-III shaft 63 respectively relative to the connection frame, and the right support frame 2a is folded and turned around the II-I shaft 51, the II-II shaft 52, and the II-III shaft 53 respectively relative to the connection frame.

Figure 7:
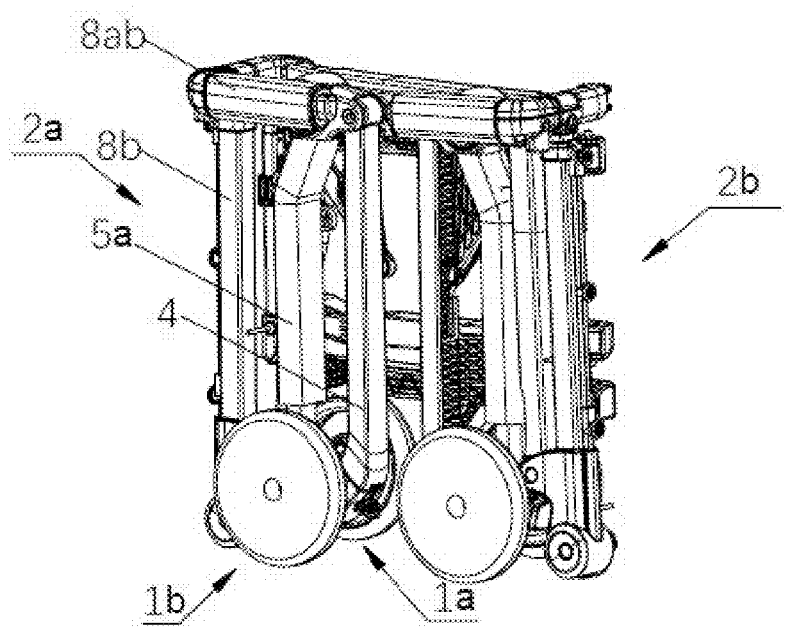
FIG. 7 is a stereogram of the stroller frame of the child stroller in a second folded state of Embodiment 1 according to the present disclosure.
Figure 8:
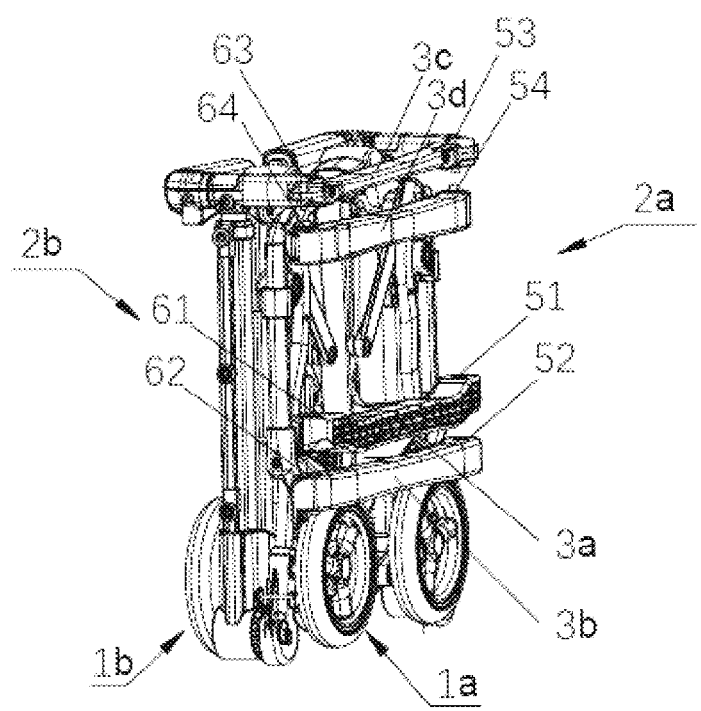
FIG. 8 is a stereogram of the stroller frame of the child stroller in the second folded state of Embodiment 1 according to the present disclosure from another perspective.
Figure 9:
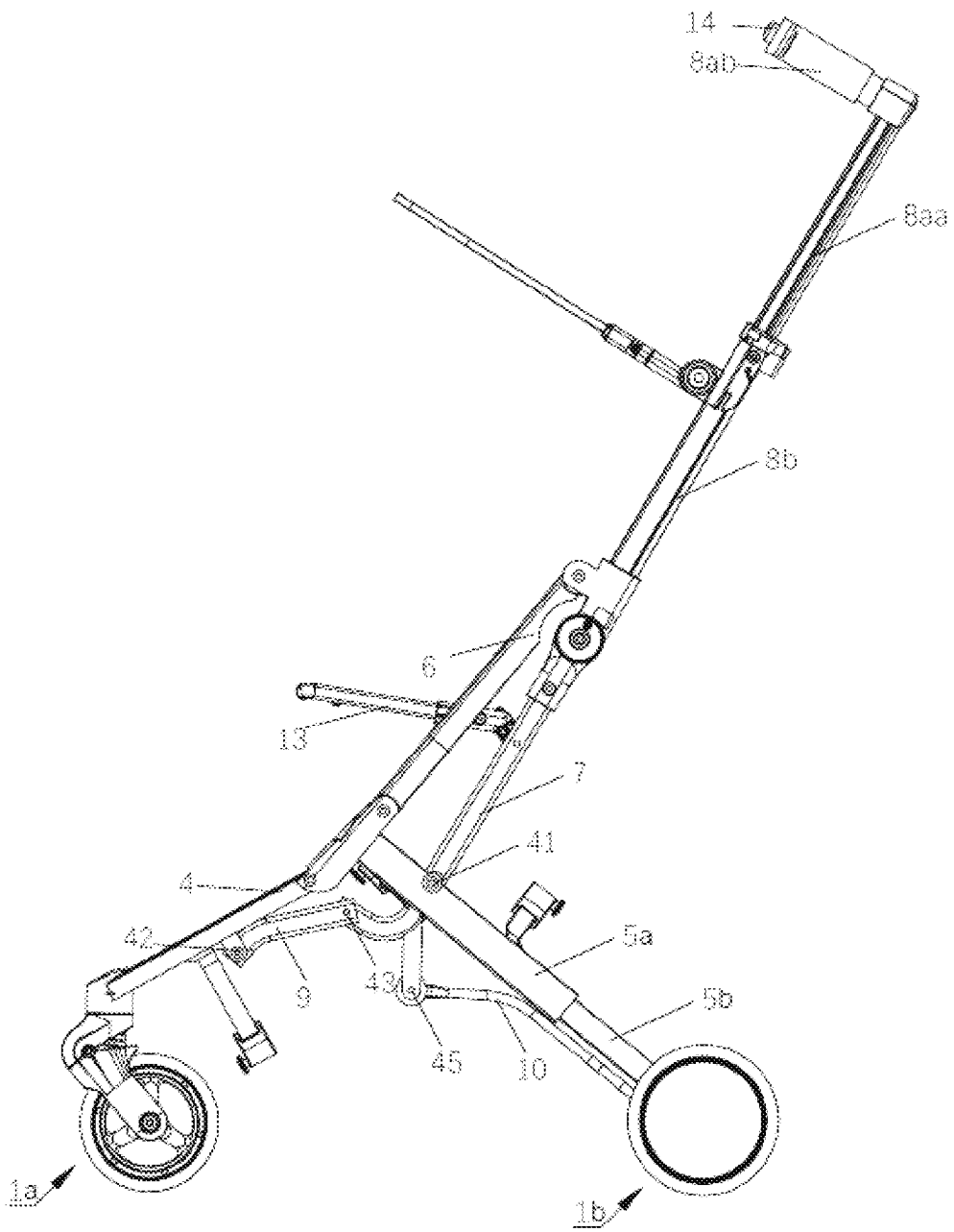
FIG. 9 is a side view of a stroller frame of an another child stroller in an unfolded state of Embodiment 2 according to the present disclosure.
Figure 10:
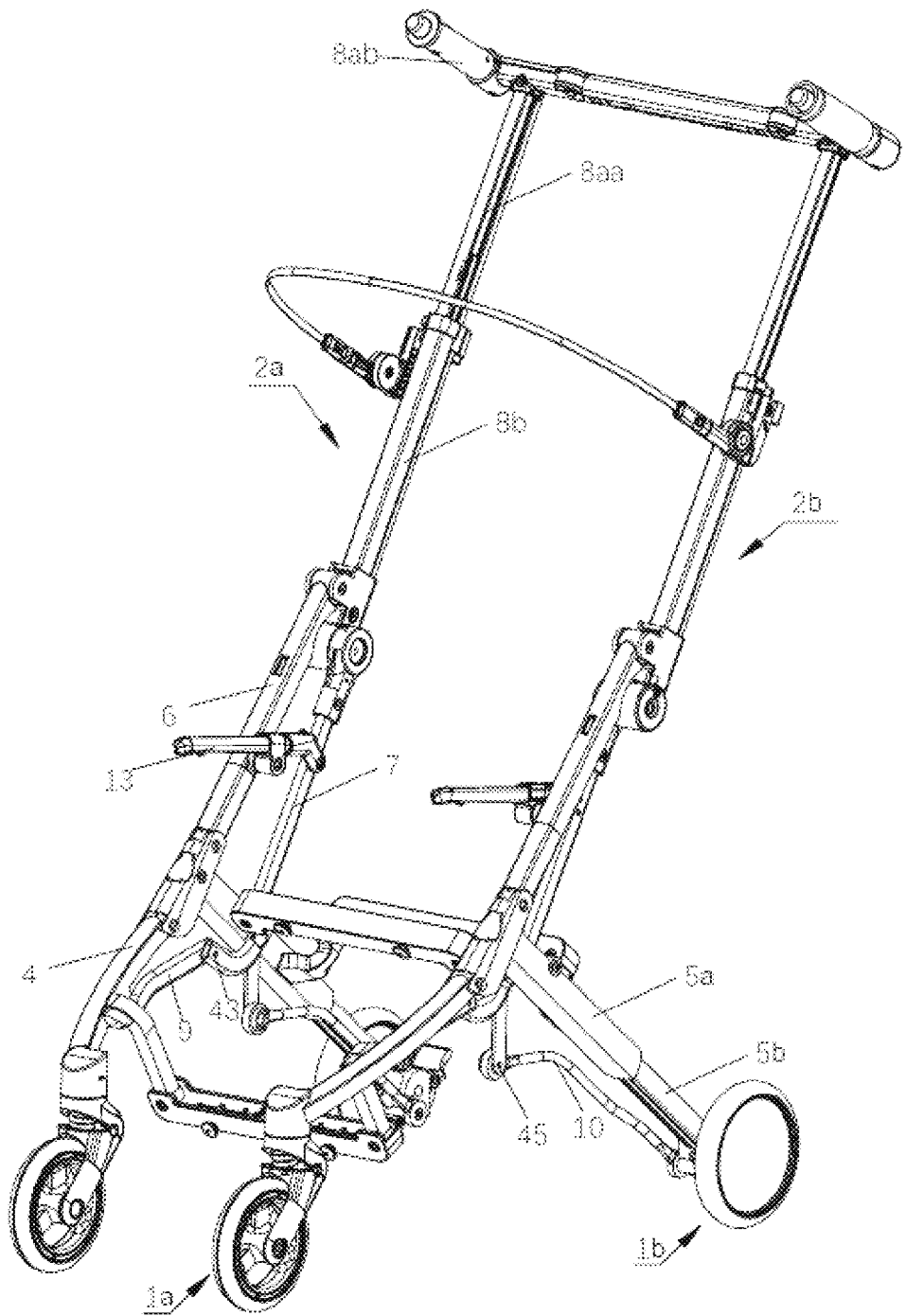
FIG. 10 is a stereogram of the stroller frame of the child stroller in the unfolded state of Embodiment 2 according to the present disclosure.
Figure 11:
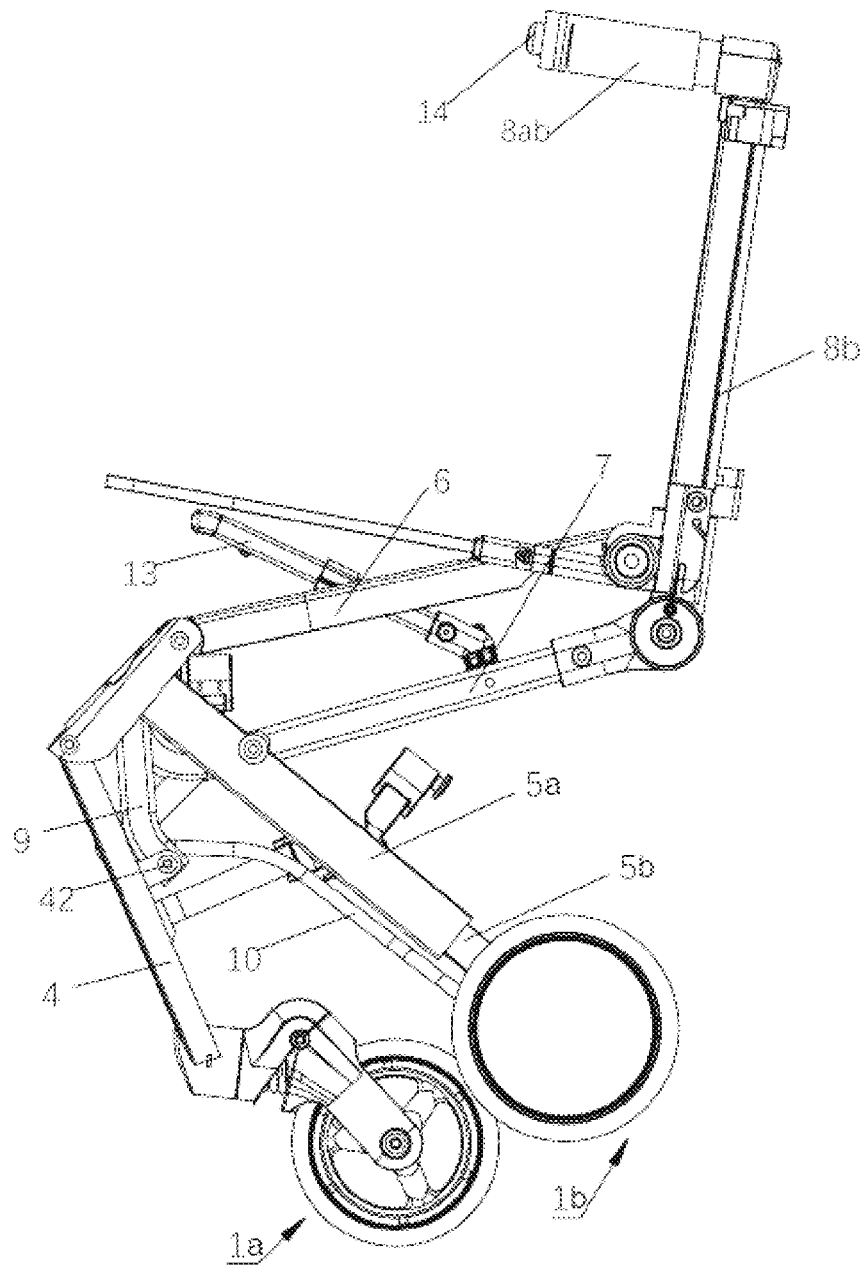
FIG. 11 is a side view of the stroller frame of the child stroller of Embodiment 2 according to the present disclosure during converting between the unfolded state and a first folded state.
Figure 12:
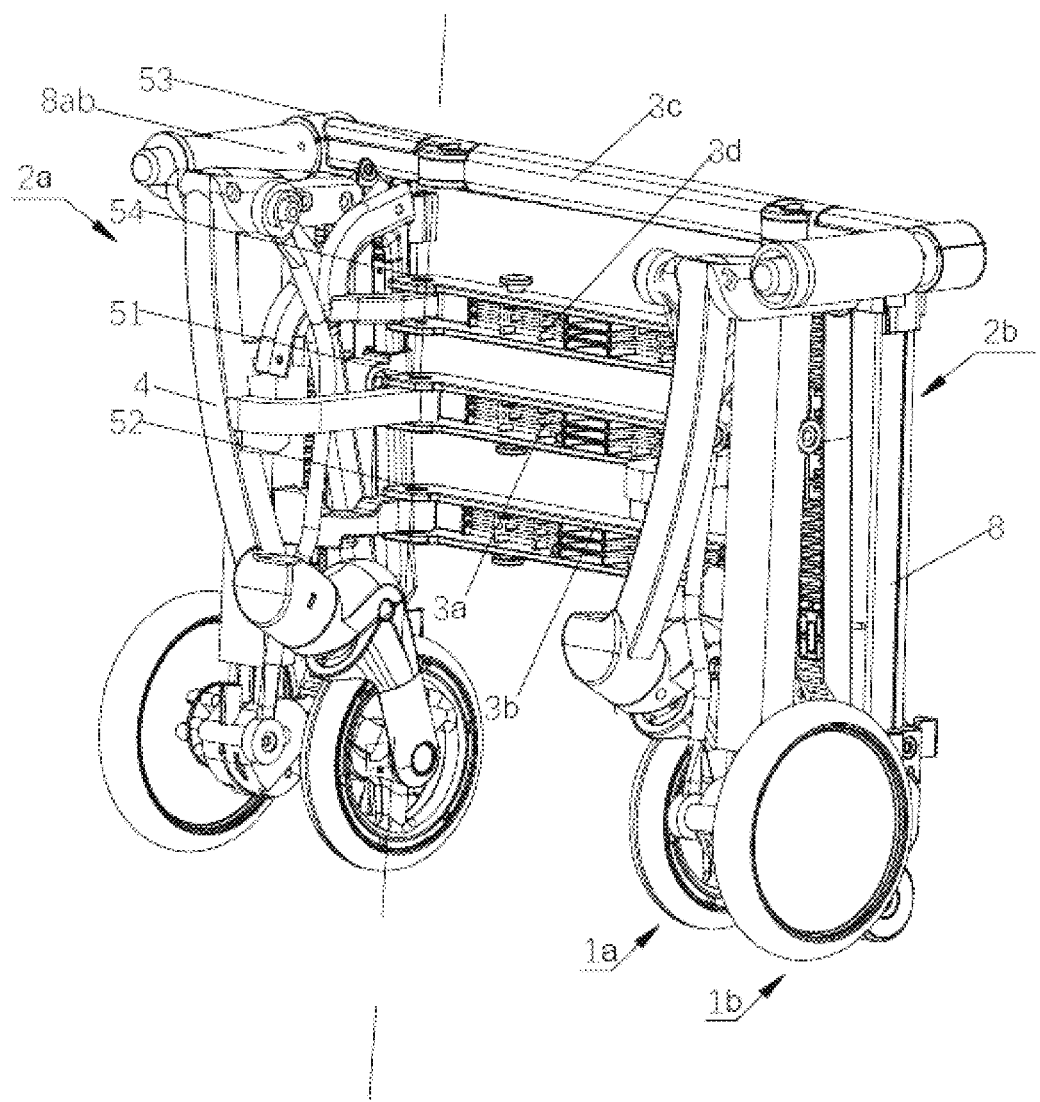
FIG. 12 is a stereogram of the stroller frame of the child stroller in the first folded state of Embodiment 2 according to the present disclosure.
Figure 13:
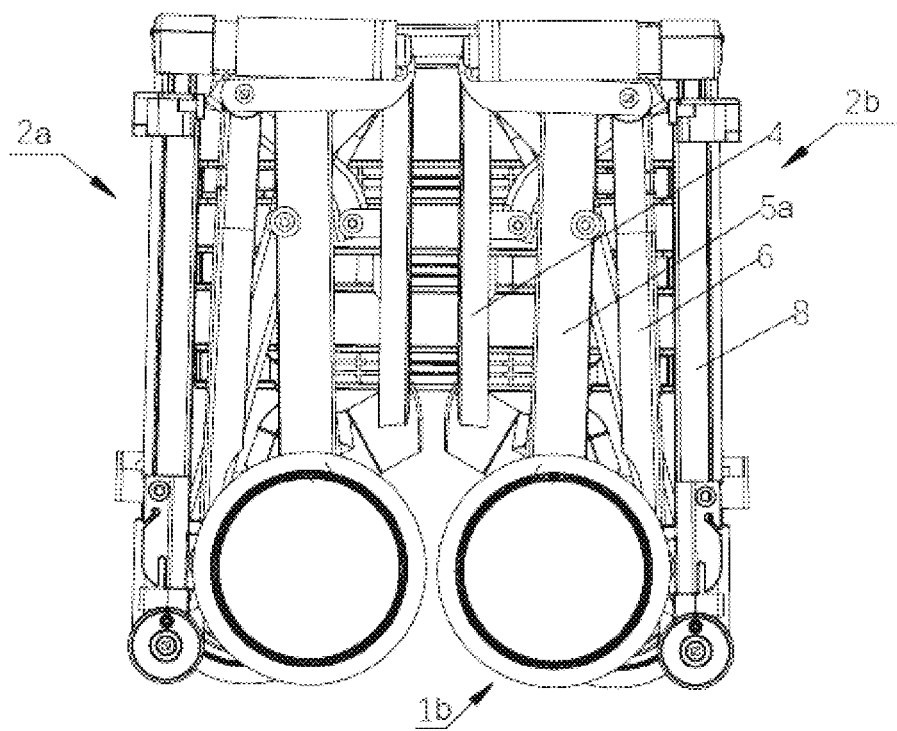
FIG. 13 is a front view of the stroller frame of the child stroller in a second folded state of Embodiment 2 according to the present disclosure.

As shown in FIGS. 7-8, when the stroller frame is in the second folded state, the axis of the I-I shaft 61, the axis of the I-II shaft 62, and the axis of the I-III shaft 63 are parallel to each other, and the axis of the II-I shaft 51, the axis of the II-II shaft 52, and the axis of the II-III shaft 53 are parallel to each other; preferably, the axis of the I-I shaft 61, the axis of the I-II shaft 62, and the axis of the I-III shaft 63 are coincident with each other, and the axis of the II-I shaft 51, the axis of the II-II shaft 52, and the axis of the II-III shaft 53 are coincident with each other, so that in the second folded state of the stroller frame, the left support frame 2b and the right support frame 2a could be more close to each other relative to the connection frame.

In order to make the stroller frame more stable in the unfolded state, preferably, the connection frame further comprises a connection-rod transverse rod 3d, wherein an end portion of the connection-rod transverse rod 3d is rotatably connected with the supporting rod 7 of the left support frame 2b via a I-IV shaft 64, an another end portion of the connection-rod transverse rod 3d is rotatably connected with the supporting rod 7 of the right support frame 2a via a II-IV shaft 54. As shown in FIGS. 7-8, when the stroller frame is in the second folded state, the axis of the I-I shaft 61, the axis of the I-II shaft 62, the axis of the I-III shaft 63 and the axis of the I-IV shaft 64 are parallel or coincident with each other, and the axis of the II-I shaft 51, the axis of the II-II shaft 52, the axis of the II-III shaft 53 and the axis of the II-IV shaft 54 are parallel or coincident with each other.

On the premise of not increasing the length of the first bottom frame 4, the second bottom frame is provided as a telescopic rod assembly, so that in the unfolded state of the stroller frame, the length of the second bottom frame is elongated, which is conducive to place a basket for placing sundries at the bottom of the stroller frame, and the height of the seat rod 13 on the stroller frame from the horizontal plane where the stroller is placed is also correspondingly increased, as shown in FIG. 1, an angle α is formed between the first bottom frame 4 and the side rod 6, and the angle range of the angle α is 135 degrees-180 degrees, the preferred angle of the angle α is 160 degrees.

Figure 5:
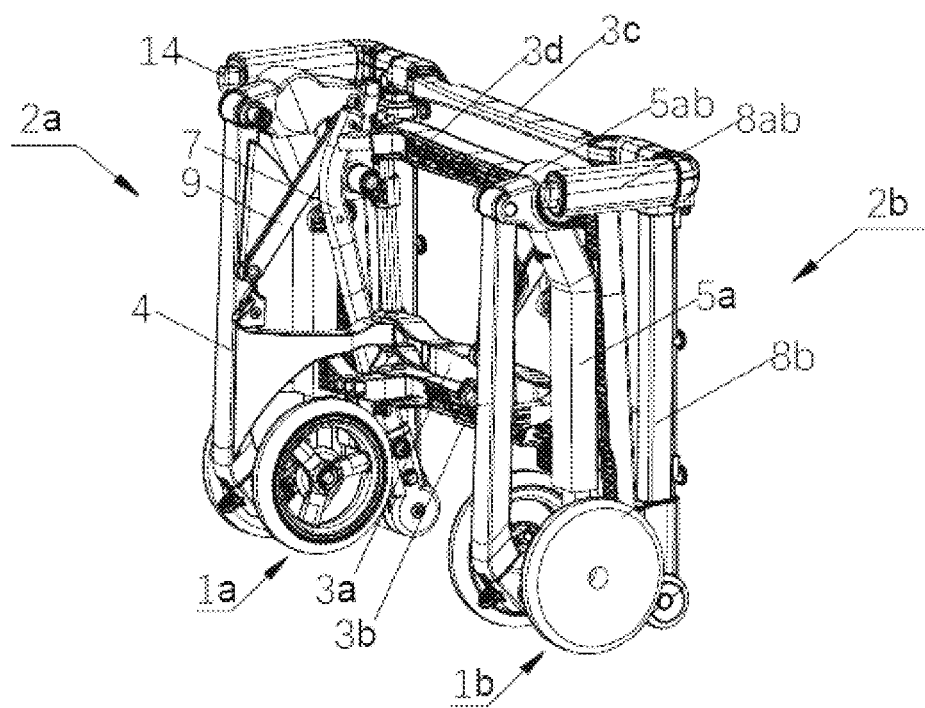
FIG. 5 is a stereogram of the stroller frame of the child stroller of Embodiment 1 according to the present disclosure in the first folded state.
Figure 6:
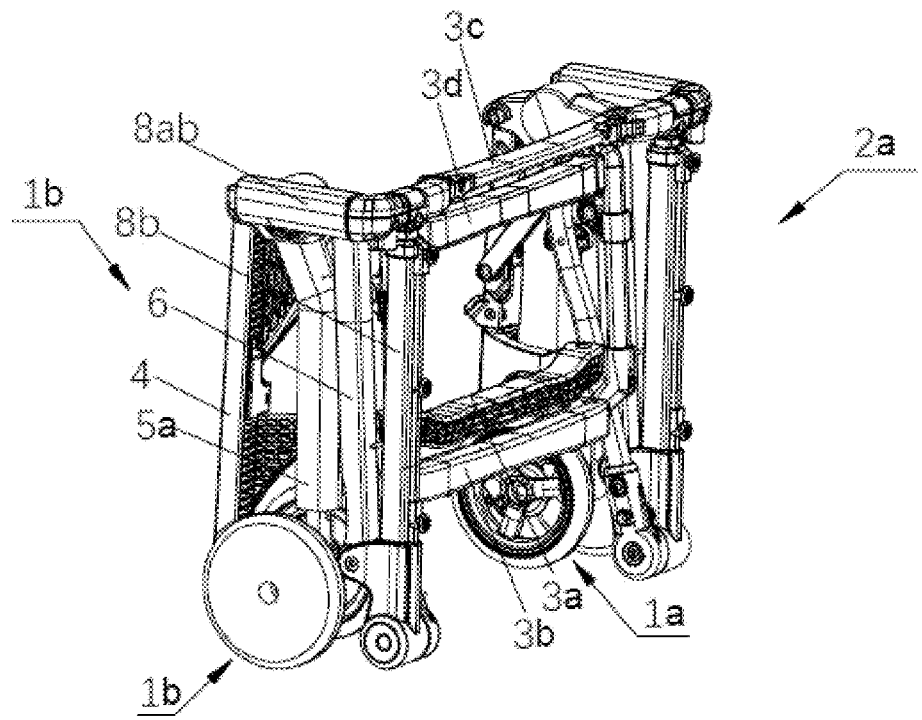
FIG. 6 is a stereogram of the stroller frame of the child stroller in the first folded state of Embodiment 1 according to the present disclosure from another perspective.

In this embodiment, in the unfolded state of the stroller frame, the distance of the first wheel assemblies 1a in a left-right direction is smaller than the distance of the second wheel assemblies 1b in the left-right direction, and each of the first wheel assemblies 1a and the second wheel assemblies 1b is provided as a single wheel, as shown in FIGS. 5-6, when the stroller frame is in the first folded state, the first wheel assemblies 1a are folded inside the second wheel assemblies 1b, and if each of the first wheel assemblies 1a and the second wheel assemblies 1b is provided as double-wheels, it will increase the folded volume of the stroller in the first folded state, and the arrangement of the single wheel makes the folded volume of the stroller in the first folded state smaller, which is also conducive to further folding into the second folded state.

The locking mechanism in this embodiment comprises a locking mechanism for locking the upper push rod and the lower push rod 8b relative to each other, an another locking mechanism for locking the push rod and the supporting rod 7 relative to each other, and a yet another locking mechanism for locking the upper rod 5a and the lower rod 5b relative to each other.

When the stroller frame of the child stroller is converted from the unfolded state to the first folded state, the unlock button 14 on the grip rod 8ab is pressed to release the relative locking relationship between the upper push rod and the lower push rod 8b, and then the upper push rod slides downward relative to the lower push rod 8b, and the upper push rod hits the unlock button arranged between the push rod and the supporting rod 7 to unlock the relative rotational relationship between the push rod and the supporting rod 7, the push rod drives the side rod 6 to turn rearward and downward around the rotating connection point with the upper end portion of the upper rod 5a, the push rod drives the supporting rod 7 to rotate rearward and downward around the first shaft 41, and moves closer to the second bottom frame, and the supporting rod 7 drives the connection rod 9, and under the action of the connection rod 9, the first bottom frame 4 is moved closer to the second bottom frame, and then the locking means between the upper rod 5a and the lower rod 5b is unlocked (not shown), and the lower rod 5b is pushed to slide upward relative to the upper rod 5a, then the second bottom frame is locked in the shortened state, as shown in FIGS. 5-6, the first folded state is achieved, at which time each of the first wheel assemblies 1a is folded between the second wheel assemblies 1b on the left and right sides, and the axis of the axle of each of the second wheel assemblies 1b extends along the left-right direction, in this embodiment, the grip rods 8ab of the left support frame 2b and the right support frame 2a extend horizontally along the front-rear direction respectively and are folded close on the left and right outermost sides of the entire stroller frame, the frontmost end of the grip rod 8ab does not exceed the frontmost end of the extension rod 5ab, and the lengths of the first transverse rod 3a, the second transverse rod 3b, the upper transverse rod 3c, and the connection-rod transverse rod 3d are equal in the left and right direction, twice the length of the entire stroller frame in the front-rear direction is less than or equal to the length of the first transverse rod 3a, the second transverse rod 3b, the upper transverse rod 3c, or the connection-rod transverse rod 3d; when the stroller frame is converted from the first folded state to the second folded state, the left support frame 2b and the right support frame 2a are turned inward by 90 degrees relative to the connection frame, as shown in FIGS. 7-8, to reach the second folded state, and at this time, the axis of the axle of each of the second wheel assemblies 1b extends in the front-rear direction, and the rearmost end of each of the first wheel assemblies 1a does not exceed the rearmost ends of four rods, namely the first transverse rod 3a, the second transverse rod 3b, the upper transverse rod 3c, or the connection-rod transverse rod 3d, and the foremost end of each of the second wheel assemblies 1b does not exceed the foremost end of the grip rod 8ab at this time.

Inversely, when the stroller frame is converted from the first folded state to the unfolded state, the locking mechanism for locking the upper rod 5a and the lower rod 5b is unlocked, and the elastic member 11 drives the lower rod 5b to slide downward relative to the upper rod 5a, so that the length of the second bottom frame is extended to reach the extended state of the second bottom frame, and then the second bottom frame is locked in the extended state.

Embodiment 2

As shown in FIGS. 9-13, a main difference between this embodiment and Embodiment 1 mainly is the driving mechanism, and due to the different driving mechanism in this embodiment, this embodiment no longer comprises a locking mechanism for locking the upper rod 5a and the lower rod 5b relative to each other.

In this embodiment, the driving mechanism comprises a driving rod 10, and the driving rod 10 is inclined downward from front to rear in the unfolded state of the stroller frame, a rear end portion of the driving rod 10 is rotatably connected to the lower rod 5b, and a front end portion of the driving rod 10 is rotatably connected with the supporting rod 7 via a fifth shaft 45, and in the unfolded state of the stroller frame, the fifth shaft 45 is located below the first shaft 41, specifically the axis of the rotating connection point between the rear end portion of the driving rod 10 and the lower rod 5b is coaxial with the axis of the second wheel assemblies 1b, the supporting rod 7 comprises a body rod and an extension rod extending in the up-down direction in the unfolded state of the stroller frame, an upper end portion of the extension rod is fixedly connected with the body rod, and a lower end portion of the extension rod is rotatably connected to the driving rod 10 via the fifth shaft 45, and the fifth shaft 45 is located below and rearward of the third shaft 43 in the unfolded state of the stroller frame.

When the stroller frame of the child stroller is converted from the unfolded state to the first folded state, the push rod is pressed downward, the push rod drives the side rod 6 to turn rearward and downward around the rotating connection point with the upper end portion of the upper rod 5a, the push rod drives the supporting rod 7 to rotate rearward and downward around the first shaft 41, and moves closer to the second bottom frame, and the supporting rod 7 drives the connection rod 9 and the driving rod 10, and under the action of the connection rod 9, the first bottom frame 4 is moved closer to the second bottom frame, the driving rod 10 drives the lower rod 5b to slide upward relative to the upper rod 5a, then the second bottom frame is shortened to the shortened state, and the first folded state is achieved; when the stroller frame is converted from the first folded state to the second folded state, the left support frame 2b and the right support frame 2a are turned inward by 90 degrees relative to the connection frame, to reach the second folded state.

Inversely, when the stroller frame is converted from the first folded state to the unfolded state, the driving rod 10 drives the lower rod 5b to slide downward relative to the upper rod 5a, so that the length of the second bottom frame is extended to reach the extended state of the second bottom frame.

Embodiment 3

Figure 14:
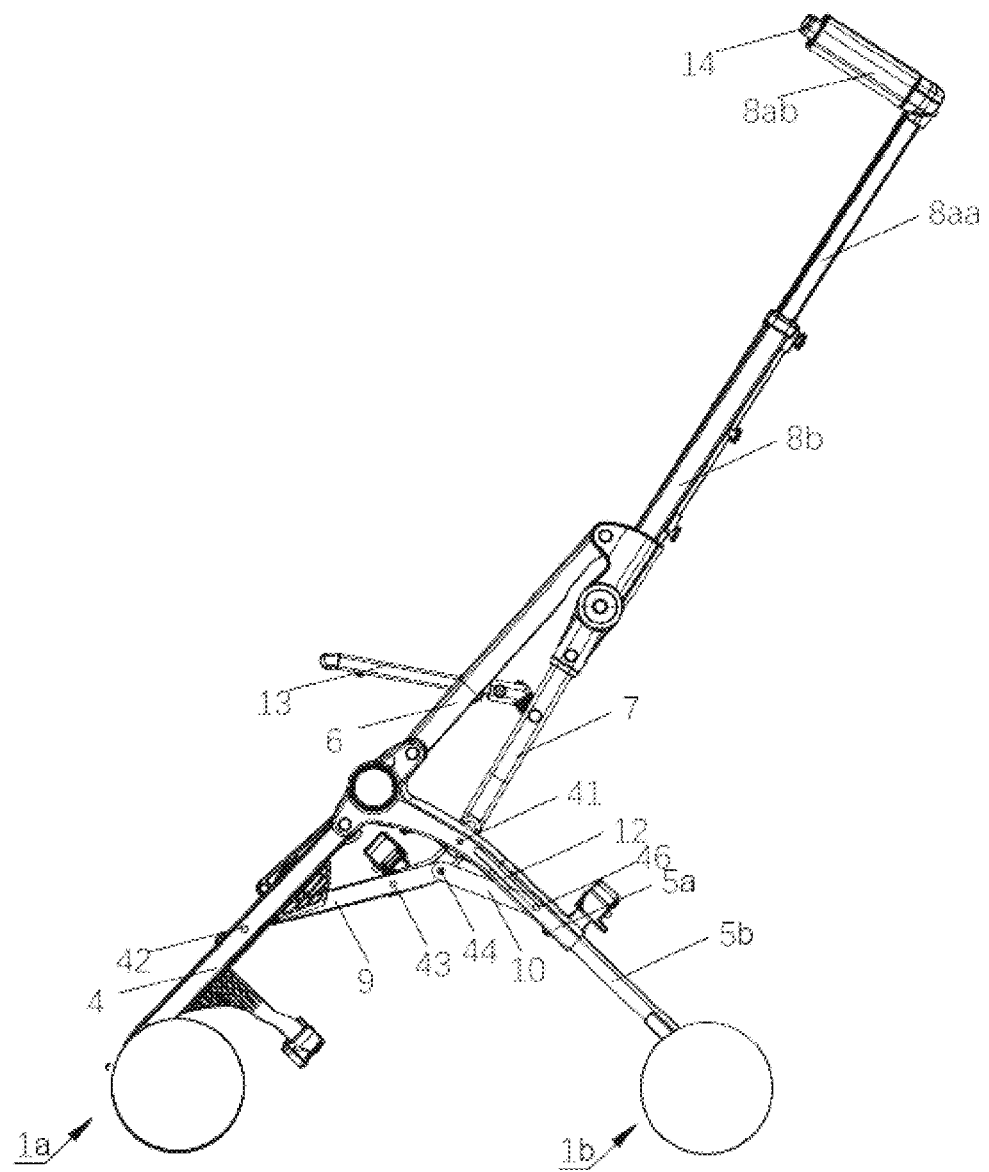
FIG. 14 is a side view of a stroller frame of a yet another child stroller in an unfolded state of Embodiment 3 according to the present disclosure.
Figure 15:
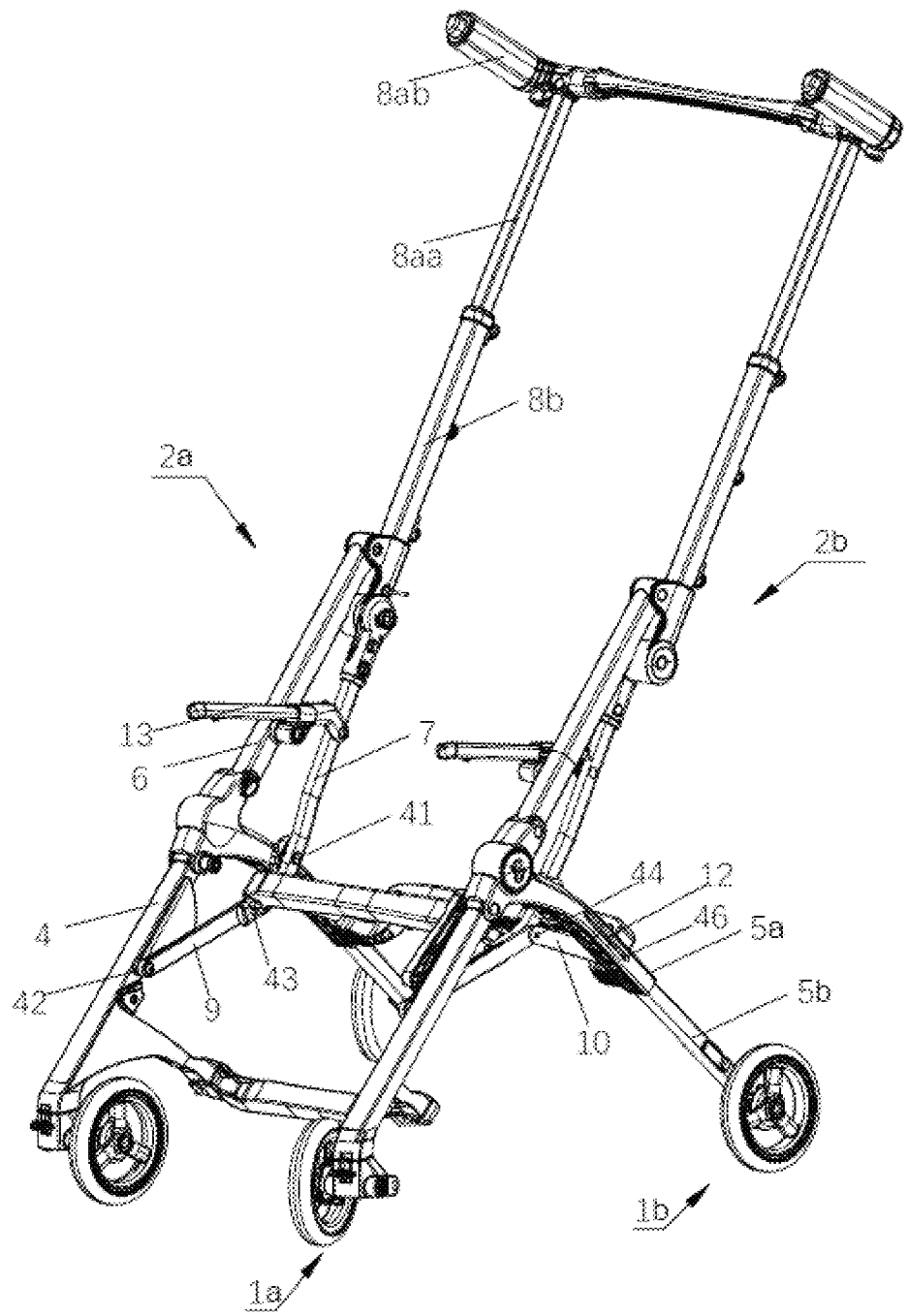
FIG. 15 is a stereogram of the stroller frame of the child stroller in the unfolded state of Embodiment 3 according to the present disclosure.
Figure 16:
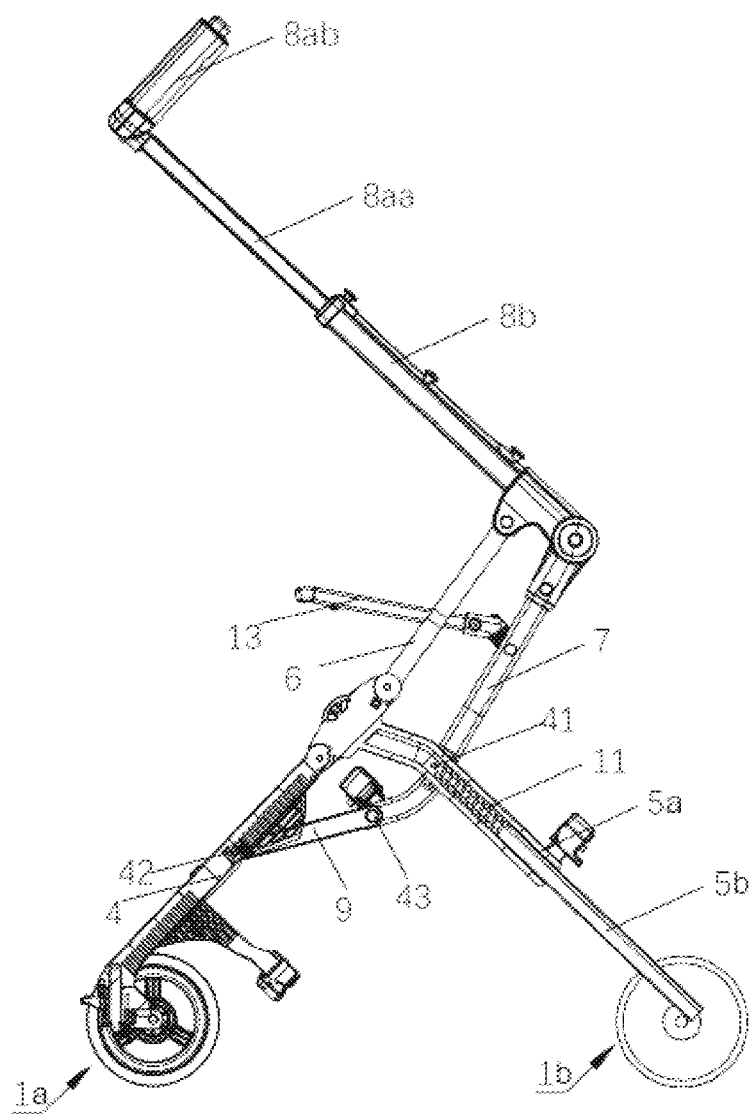
FIG. 16 is a side cross-sectional view of a stroller frame of a yet another child stroller of Embodiment 4 according to the present disclosure in an unfolded state (Embodiment 4)
Figure 17:
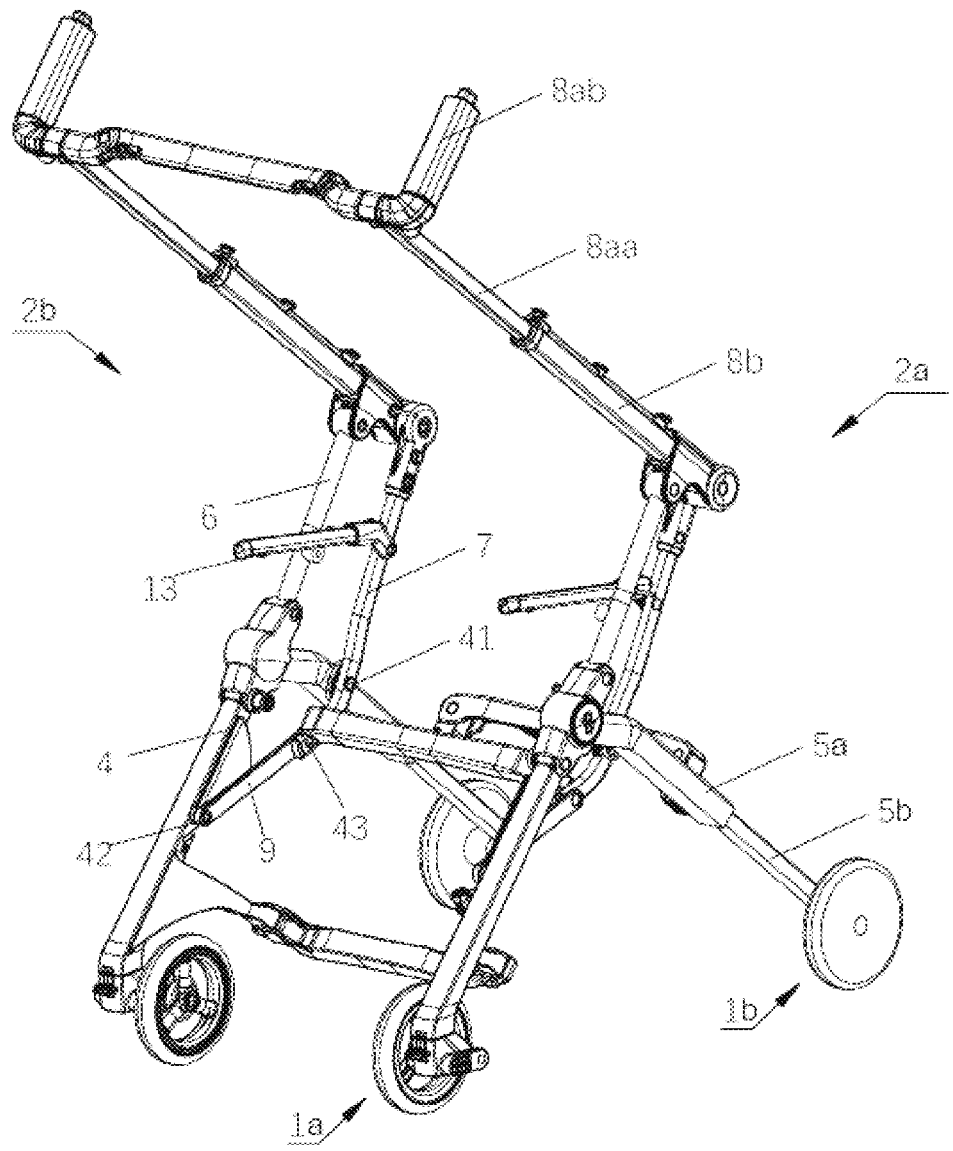
FIG. 17 is a stereogram of the stroller frame of the child stroller in the unfolded state of Embodiment 4 according to the present disclosure.
Figure 18:
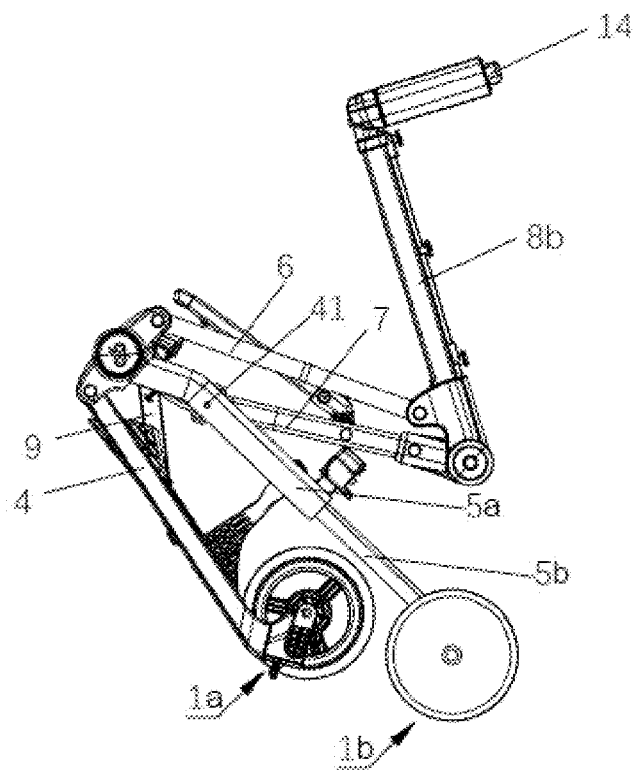
FIG. 18 is a side view of the stroller frame of the child stroller of Embodiment 4 according to the present disclosure during converting between the unfolded state and the first folded state.
Figure 19:
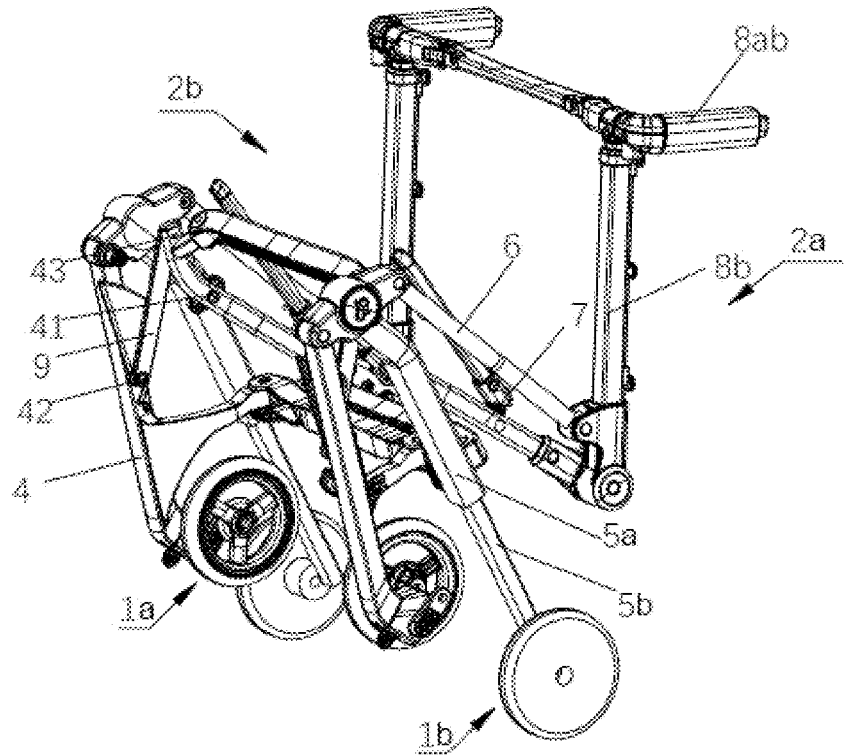
FIG. 19 is a stereogram of the stroller frame of the child stroller of Embodiment 4 according to the present disclosure during converting between the unfolded state and the first folded state.

As shown in FIGS. 14-15, a main difference between this embodiment and Embodiment 1 is the driving mechanism.

In this embodiment, the driving mechanism comprises a driving rod 10, and the driving rod 10 extends in the front-rear direction in the unfolded state of the stroller frame, a rear end portion of the driving rod 10 is rotatably connected to the lower rod 5b, a front end portion of the driving rod 10 is rotatably connected to the connection rod 9 via a fourth shaft 44, and the third shaft 43 is located between the second shaft 42 and the fourth shaft 44. Specifically, the driving rod 10 is rotatably connected to the upper portion of the lower rod 5b via a sixth shaft 46, the upper rod 5a is provided with a guide groove 12 extending in an extension direction of the upper rod 5a, and the sixth shaft 46 is slidably arranged in the guide groove 12.

When the stroller frame of the child stroller is converted from the unfolded state to the first folded state, the push rod is pressed downward, the push rod drives the side rod 6 to turn rearward and downward around the rotating connection point with the upper end portion of the upper rod 5a, the push rod drives the supporting rod 7 to rotate rearward and downward around the first shaft 41, and moves closer to the second bottom frame, and the supporting rod 7 drives the connection rod 9, and under the action of the connection rod 9, the first bottom frame 4 is moved closer to the second bottom frame, the connection rod 9 drives the driving rod 10, the sixth shaft 46 slides in the guide groove 12 of the upper rod 5a from bottom to top, so that the lower rod 5b slides upward relative to the upper rod 5a, so that the second bottom frame is shortened to the shortened state, and the first folded state is achieved; when the stroller frame is converted from the first folded state to the second folded state, the left support frame 2b and the right support frame 2a are turned inward by 90 degrees relative to the connection frame, to reach the second folded state.

Inversely, when the stroller frame is converted from the first folded state to the unfolded state, the driving rod 10 drives the sixth shaft 46 to slide in the guide groove 12 from top to bottom, so that the lower rod 5b slides downward relative to the upper rod 5a, so that the length of the second bottom frame is extended to reach the extended state of the second bottom frame.

Embodiment 4

As shown in FIGS. 16-19, a main difference between this embodiment and Embodiment 1 is that: in this embodiment, each first bottom frame is inclined upward from rear to front in the unfolded state of the stroller frame, and each second bottom frame is inclined upward from front to rear in the unfolded state of the stroller frame, each first wheel assemblies 1a is a rear wheel assemblies, and each second wheel assemblies 1b is a front wheel assemblies. Specifically, in the unfolded state of the stroller frame, each push rod is inclined upward from front to rear.

Accordingly, a rear end portion of each connection rod 9 is rotatably connected to a lower portion of the first bottom frame 4 via a second shaft 42, and a front end portion of each connection rod 9 is rotatably connected to a lower portion of the supporting rod 7 via a third shaft 43.

When the stroller frame of the child stroller is converted from the unfolded state to the first folded state, the push rod is pressed downward, the push rod drives the side rod 6 to turn forward and downward around the rotating connection point with the upper end portion of the upper rod 5a, the push rod drives the supporting rod 7 to rotate forward and downward around the first shaft 41, and moves closer to the second bottom frame, and the supporting rod 7 drives the connection rod 9, under the action of the connection rod 9, the first bottom frame 4 is moved closer to the second bottom frame, the locking means between the upper rod 5a and the lower rod 5b is unlocked to push the lower rod 5b, so that the lower rod 5b slides upward relative to the upper rod 5a, the second bottom frame is locked in the shortened state, and the first folded state is achieved.

Embodiment 5

Figure 20:
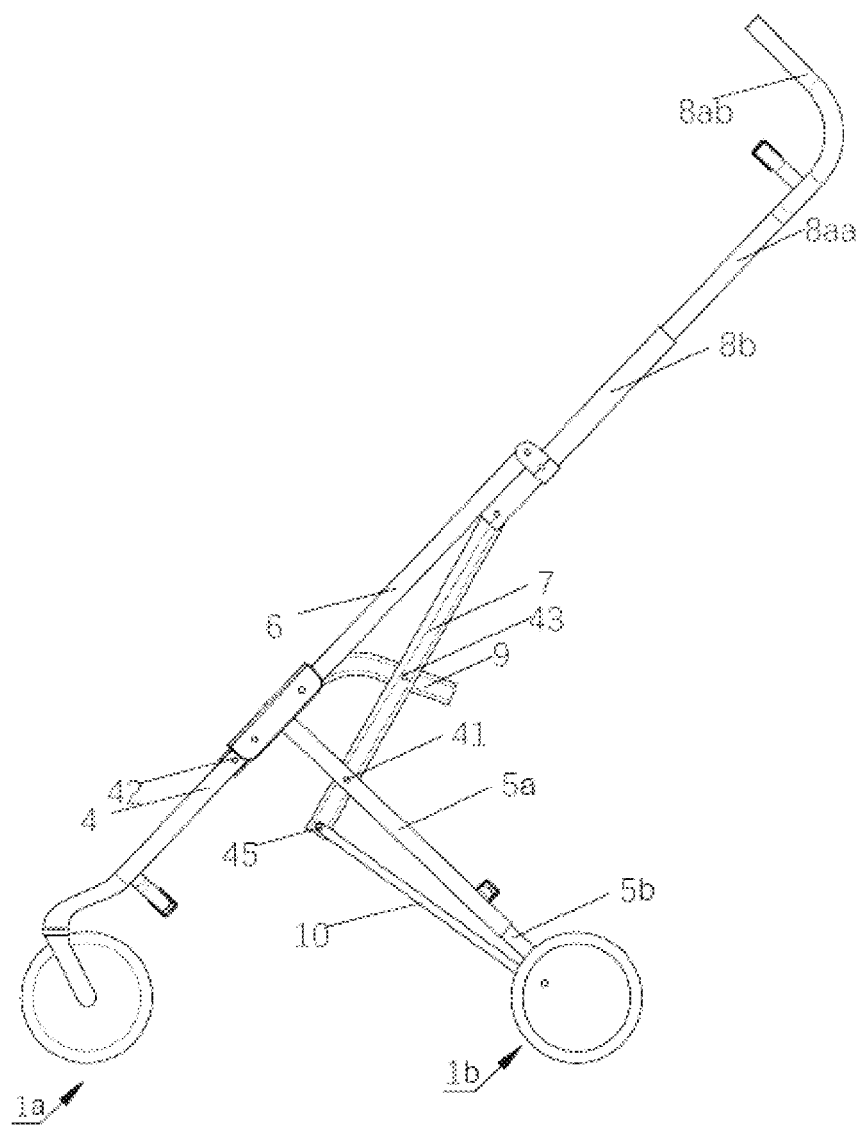
FIG. 20 is a side view of a stroller frame of a yet another child stroller in an unfolded state of Embodiment 5 according to the present disclosure.
Figure 21:
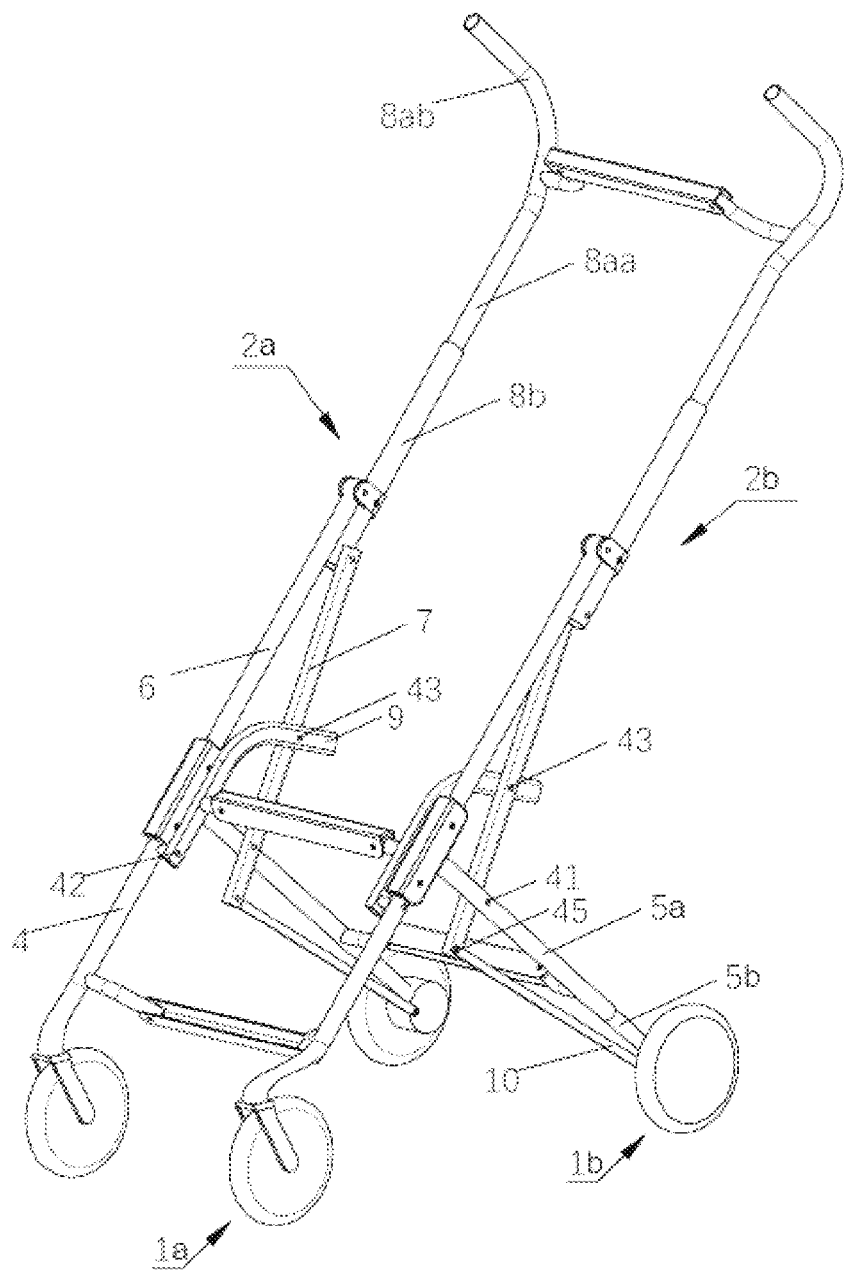
FIG. 21 is a stereogram of the stroller frame of the child stroller in the unfolded state of Embodiment 5 according to the present disclosure.

As shown in FIGS. 20-21, a main difference between this embodiment and Embodiment 2 is that in the unfolded state of the stroller frame, the third shaft 43 at the rotating connection point between the connection rod 9 and the supporting rod 7 is arranged above the first shaft 41 at the rotating connection point between the supporting rod 7 and the upper rod 5a, of course, in the unfolded state of the stroller frame, the third shaft 43 can also be arranged on the same horizontal plane as the first shaft 41.

In addition, in this embodiment, the connection rod 9 is used as the seat rod 13, and the seat rod 13 provided in Embodiment 2 is omitted. Specifically, the upper portion of the connection rod 9 is bent rearward to form a functional part corresponding to the seat rod 13.

The embodiments described above are only for illustrating the technical concepts and features of the present disclosure, and are intended to make those skilled in the art being able to understand the present disclosure and thereby implement it, and should not be concluded to limit the protective scope of this disclosure. Any equivalent variations or modifications according to the spirit of the present disclosure should be covered by the protective scope of the present disclosure.

What is claimed is:

1. A child stroller comprising:
a stroller frame having an unfolded state and a first folded state;
first wheel assemblies;
second wheel assemblies;
a lock mechanism for locking the stroller frame in the unfolded state; and
a seat rod disposed on the stroller frame,
wherein the stroller frame comprises a left support frame on a left side, a right support frame on a right side, and a connection frame connected between the left support frame and the right support frame, and each of the left support frame and the right support frame comprises:
a first bottom frame, with a lower end portion connected to one of the first wheel assemblies;
a second bottom frame,
    wherein the second bottom frame is a telescopic rod assembly,
    wherein the second bottom frame comprises an upper rod with a lower end portion connected to one of the second wheel assemblies, and
    wherein the second bottom frame further comprises a lower rod disposed below the upper rod and slidably connected to the upper rod in an up-down direction;
a side rod, with a lower end portion,
    wherein two portions selected from a group consisting of an upper end portion of the first bottom frame, an upper end portion of the upper rod, and the lower end portion of the side rod are rotatably connected, and a third portion selected from the group is rotatably connected to one of the two portions;
a supporting rod, rotatably connected to the upper rod via a first shaft;
a push rod, with a lower portion being respectively connected to an upper end portion of the side rod and an upper end portion of the supporting rod; and
a connection rod extending in a front-rear direction when the stroller frame is in the unfolded state, having an end portion rotatably connected to a lower portion of the first bottom frame via a second shaft, and being further rotatably connected to the supporting rod via a third shaft,
wherein, when the stroller frame is in the unfolded state, one of the first bottom frame and the second bottom frame is inclined from front to rear in an upward direction, and the other one is inclined from rear to front in the upward direction.

2. The child stroller according to claim 1, wherein the third shaft is below the first shaft when the stroller frame is in the unfolded state.

3. The child stroller according to claim 1, wherein the third shaft is above the first shaft when the stroller frame is in the unfolded state.

4. The child stroller according to claim 1, wherein the first wheel assemblies are front wheel assemblies, and the second wheel assemblies are rear wheel assemblies.

5. The child stroller according to claim 1, wherein the child stroller further comprises a driving mechanism for driving the lower rod to slide upward relative to the upper rod when the stroller frame is converted from the unfolded state to the first folded state, and/or driving the lower rod to slide downward relative to the upper rod when the stroller frame is converted from the first folded state to the unfolded state.

6. The child stroller according to claim 5, wherein the upper rod is slidably inserted in the lower rod or the lower rod is slidably inserted in the upper rod, and the driving mechanism is an elastic member arranged between the upper rod and the lower rod for providing an elastic force required for the lower rod to slide downward relative to the upper rod.

7. The child stroller according to claim 5, wherein the driving mechanism is a driving rod extending in the front-rear direction in the unfolded state of the stroller frame, one end portion of the driving rod is rotatably connected with the lower rod via a sixth shaft, an another end portion of the driving rod is rotatably connected with the connection rod via a fourth shaft, and the third shaft is located between the second shaft and the fourth shaft.

8. The child stroller according to claim 7, wherein the upper rod is provided with a guide groove extending in an extension direction of the upper rod, and the sixth shaft is slidably arranged in the guide groove.

9. The child stroller according to claim 5, wherein the driving mechanism is a driving rod, one end portion of the driving rod is rotatably connected with the lower rod, an another end portion of the driving rod is rotatably connected with the supporting rod via a fifth shaft, and the fifth shaft is located below the first shaft when the stroller frame is in the unfolded state.

10. The child stroller according to claim 1, wherein the connection frame comprises:
a first transverse rod, with a first end portion rotatably connected with the first bottom frame of the left support frame via a seventh shaft, and a second end portion rotatably connected with the first bottom frame of the right support frame via a eighth shaft;
a second transverse rod, with an a third end portion being rotatably connected with the second bottom frame of the left support frame via a ninth shaft, and a fourth end portion being rotatably connected with the second bottom frame of the right support frame via a tenth shaft;
an upper transverse rod, with a a fifth end portion being rotatably connected with the push rod of the left support frame via a eleventh shaft, and a sixth end portion being rotatably connected with the push rod of the right support frame via a twelfth shaft;
wherein the stroller frame further comprises a second folded state, wherein when the stroller frame is converted from the first folded state to the second folded state, the left support frame is configured to fold and turn around seventh shaft, ninth shaft, and the eleventh shaft, respectively, relative to the connection frame, and the right support frame is configured to fold and turn around the eighth shaft, the tenth shaft, and the twelfth shaft, respectively, relative to the connection frame.

11. The child stroller according to claim 10, wherein the third end portion of the second transverse rod is rotatably connected with the upper rod of the left support frame via the ninth shaft, and the fourth end portion of the second transverse rod is rotatably connected with the upper rod of the right support frame via the tenth shaft.

12. The child stroller according to claim 10, wherein, when the stroller frame is in the second folded state, axes of the seventh shaft, the ninth shaft, and the eleventh shaft are parallel to each other, and axes of the eighth shaft, the tenth shaft, and the twelfth shaft are parallel to each other, or
    wherein, when the stroller frame is in the second folded state, axes of the seventh shaft, the ninth shaft, and the eleventh shaft are coincident with each other, and axes of the eighth shaft, the tenth shaft, and the twelfth shaft are coincident with each other.

13. The child stroller according to claim 12, wherein the connection frame further comprises a connection-rod transverse rod,
    wherein an end portion of the connection-rod transverse rod is rotatably connected with the supporting rod of the left support frame via a thirteenth shaft and an another end portion of the connection-rod transverse rod is rotatably connected with the supporting rod of the right support frame via a fourteenth shaft, and wherein, when the stroller frame is in the second folded state, axes of the first shaft, the third shaft, the fifth shaft, and the thirteenth shaft are parallel or coincident with each other, and axes of the second shaft, the fourth shaft, the sixth shaft and the fourteenth shaft are parallel or coincident with each other.

14. The child stroller according to claim 10, wherein, when the stroller frame is in the second folded state, the first wheel assemblies and the second wheel assemblies are overlapped in the front-rear direction.

\* \* \* \* \*